United States Patent
Koch et al.

(10) Patent No.: US 10,134,049 B2
(45) Date of Patent: Nov. 20, 2018

(54) CUSTOMER SERVICE BASED UPON IN-STORE FIELD-OF-VIEW AND ANALYTICS

(71) Applicant: AT&T Intellectual Property I, L.P., Atlanta, GA (US)

(72) Inventors: Robert Alan Koch, Norcross, GA (US); Ari Craine, Marietta, GA (US); James Carlton Bedingfield, Sr., Gainesville, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 973 days.

(21) Appl. No.: 14/549,010

(22) Filed: Nov. 20, 2014

(65) Prior Publication Data

US 2016/0148218 A1    May 26, 2016

(51) Int. Cl.
*G06Q 30/00* (2012.01)
*G06Q 30/02* (2012.01)
*G06Q 50/00* (2012.01)
*H04L 12/58* (2006.01)

(52) U.S. Cl.
CPC ....... *G06Q 30/0201* (2013.01); *G06Q 30/016* (2013.01); *G06Q 50/01* (2013.01); *H04L 51/32* (2013.01)

(58) Field of Classification Search
None
See application file for complete search history.

(56) References Cited

U.S. PATENT DOCUMENTS

| | | | |
|---|---|---|---|
| 4,973,952 A | 11/1990 | Malec et al. | |
| 6,091,956 A | 7/2000 | Hollenberg | |
| 6,571,279 B1 | 5/2003 | Herz et al. | |
| 6,624,757 B1 | 9/2003 | Johnson | |
| 7,006,982 B2 | 2/2006 | Sorensen | |
| 7,084,765 B2 | 8/2006 | Clapper | |

(Continued)

OTHER PUBLICATIONS

Shi et al., "Information Acquisition During Online Decision Making: A Model-Based Exploration Using Eye-Tracking Data," Management Science, Dec. 19, 2012, pp. 1009-1026, vol. 59, Issue 5.

(Continued)

*Primary Examiner* — Matthew T Sittner
(74) *Attorney, Agent, or Firm* — Hartman & Citrin LLC

(57) ABSTRACT

Concepts and technologies disclosed herein are directed to aspects of customer service based upon in-store field-of-view and analytics. According to one aspect disclosed herein, a store analytics system can collect user information associated with a plurality of users located within an environment. The store analytics system also can collect user device information associated with a plurality of user devices associated with the plurality of users. The store analytics system also can collect estimated fields-of-view associated with the plurality of users. The store analytics system can analyze the user information, the user device information, and the estimated fields-of-view to identify at least one commonality shared among at least two of the plurality of users. The store analytics system can create a logical group. The logical group can include the at least two users of the plurality of users that share the commonality.

20 Claims, 17 Drawing Sheets

(56) References Cited

U.S. PATENT DOCUMENTS

| | | |
|---|---|---|
| 7,263,378 B2 | 8/2007 | Inselberg |
| 7,372,451 B2 | 5/2008 | Dempski |
| 7,420,464 B2 | 9/2008 | Fitzgerald et al. |
| 7,463,143 B2 | 12/2008 | Farr et al. |
| 7,475,813 B2 | 1/2009 | Swanson, Sr. |
| 7,856,360 B2 | 12/2010 | Kramer et al. |
| 7,856,368 B2 | 12/2010 | Avallone et al. |
| 7,933,797 B2 | 4/2011 | Sorensen |
| 8,050,984 B2 | 11/2011 | Bonner et al. |
| 8,335,524 B2 | 12/2012 | Shutter |
| 8,380,558 B1 | 2/2013 | Sharma et al. |
| 8,437,776 B2 | 5/2013 | Busch |
| 8,442,500 B2 | 5/2013 | Gupta et al. |
| 8,467,991 B2 | 6/2013 | Khosravy et al. |
| 8,589,230 B1* | 11/2013 | Bickerstaff ........ G06Q 30/0251 705/14.4 |
| 8,600,828 B2 | 12/2013 | Bonner et al. |
| 8,612,294 B1 | 12/2013 | Treyz et al. |
| 8,694,376 B2 | 4/2014 | Bishop |
| 8,761,786 B2* | 6/2014 | Monnes .................. H04W 4/02 370/229 |
| 9,626,709 B2* | 4/2017 | Koch .................. G06Q 30/0623 |
| 2005/0038749 A1* | 2/2005 | Fitch ....................... H04H 60/45 705/51 |
| 2005/0039206 A1* | 2/2005 | Opdycke ................. G06Q 30/02 725/35 |
| 2005/0131721 A1* | 6/2005 | Doctorow .............. G06Q 30/00 705/1.1 |
| 2006/0010027 A1* | 1/2006 | Redman ......... G06Q 10/063116 705/7.16 |
| 2006/0122917 A1* | 6/2006 | Lokuge ............. G06F 17/30861 705/27.1 |
| 2008/0040219 A1 | 2/2008 | Kim et al. |
| 2008/0042836 A1 | 2/2008 | Christopher |
| 2008/0074264 A1 | 3/2008 | Sharpe et al. |
| 2008/0147461 A1 | 6/2008 | Lee et al. |
| 2008/0153513 A1 | 6/2008 | Flake et al. |
| 2008/0232641 A1 | 9/2008 | Borger et al. |
| 2008/0282324 A1* | 11/2008 | Hoal ....................... G06Q 30/02 726/3 |
| 2008/0306756 A1* | 12/2008 | Sorensen ................ G06Q 30/02 705/27.1 |
| 2009/0271251 A1* | 10/2009 | Sorensen ................ G06Q 30/02 348/14.01 |
| 2011/0143779 A1 | 6/2011 | Rowe et al. |
| 2011/0161136 A1 | 6/2011 | Faith et al. |
| 2011/0246544 A1* | 10/2011 | Davis ................ G06F 17/30533 707/822 |
| 2011/0270712 A1 | 11/2011 | Wood et al. |
| 2012/0016747 A1 | 1/2012 | Pan |
| 2012/0042253 A1* | 2/2012 | Priyadarshan ......... G06Q 30/02 715/733 |
| 2012/0042262 A1* | 2/2012 | Priyadarshan ..... G06Q 30/0269 715/745 |
| 2012/0239504 A1* | 9/2012 | Curlander ............ G06Q 30/02 705/14.66 |
| 2012/0331090 A1* | 12/2012 | Kimchi ............... H04L 67/1046 709/217 |
| 2013/0030949 A1* | 1/2013 | Sundaresan ........... G06Q 30/06 705/26.7 |
| 2013/0073988 A1 | 3/2013 | Groten et al. |
| 2013/0101163 A1 | 4/2013 | Gupta et al. |
| 2013/0173355 A1* | 7/2013 | Barcenas ......... G06Q 10/06393 705/7.39 |
| 2013/0191213 A1 | 7/2013 | Beck et al. |
| 2013/0232010 A1* | 9/2013 | Kritt .................. G06Q 30/0267 705/14.64 |
| 2013/0238234 A1 | 9/2013 | Chao et al. |
| 2013/0286048 A1 | 10/2013 | Sternitzke |
| 2013/0339123 A1* | 12/2013 | Ennis .................. G06Q 30/0225 705/14.26 |
| 2014/0002644 A1 | 1/2014 | Fedorovskaya et al. |
| 2014/0006229 A1 | 1/2014 | Birch et al. |
| 2014/0012641 A1* | 1/2014 | Birch ......................... G09F 9/30 705/14.4 |
| 2014/0095257 A1* | 4/2014 | Lewis ................ G06O 30/0202 705/7.31 |
| 2014/0176723 A1* | 6/2014 | Sorensen ............... G06Q 30/02 348/158 |
| 2014/0236728 A1 | 8/2014 | Wright |
| 2014/0279014 A1 | 9/2014 | Roka et al. |
| 2015/0106236 A1* | 4/2015 | Morris ............... G06Q 30/0629 705/26.64 |
| 2015/0149254 A1* | 5/2015 | Sakamoto .......... G06Q 30/0201 705/7.34 |
| 2015/0161649 A1* | 6/2015 | Eggleston .......... G06Q 30/0236 705/14.36 |
| 2015/0227977 A1* | 8/2015 | Shottan ............... G06Q 30/0267 705/14.64 |
| 2015/0254710 A1* | 9/2015 | Black .................. G06Q 30/0255 705/14.53 |
| 2015/0302500 A1* | 10/2015 | Koch ................. G06Q 30/0623 705/26.61 |
| 2016/0048858 A1* | 2/2016 | Bernard ............. G06Q 30/0205 705/7.34 |
| 2016/0063517 A1* | 3/2016 | Sorensen ........... G06Q 30/0201 705/7.29 |
| 2016/0127775 A1* | 5/2016 | Zilberstein ......... G06Q 30/0271 725/34 |
| 2016/0148218 A1* | 5/2016 | Koch .................. G06Q 30/0201 705/7.29 |

OTHER PUBLICATIONS

Yada, Katsutoshi, "String analysis technique for shopping path in a supermarket," Journal of Intelligent Information Systems 36.3, Dec. 3, 2009, pp. 385-402.

Newman et al., "New insights in to retail space and format planning from customer-tracking data," Journal of Retailing and Consumer Services, Sep. 2002, vol. 9, Issue 5, pp. 253-258.

Uotila et al., "Space management in a DIY store analyzing consumer shopping paths with data-tracking devices," Facilities, 2007, vol. 25, Issue 9/10, pp. 363-374.

Wedel et al., "Looking at vision," The Routledge Companion to the Future of Marketing, 2014.

Jung et al., "A Sequence Pattern Matching Approach to Shopping Path Clustering," Proceedings of the 2012 International Conference on Industrial Engineering and Operations Management, Jul. 3-6, 2012.

Kim, Byoungjip, et al. "Adnext: a visit-pattern-aware mobile advertising system for urban commercial complexes." Proceedings of the 12th Workshop on Mobile Computing Systems and Applications. ACM, 2011.

Zhu, Wei, et al. "Personalized in-store e-commerce with the promopad: an augmented reality shopping assistant." Electronic Journal for E-commerce Tools and Applications 1.3 (2004): 1-19.

"The Incredibly Shrinking (In-Store) "Audience"", retrieved from http://www.insidethemindoftheshopper.com/2014-02-24.html on Apr. 16, 2014.

* cited by examiner

CUSTOMER SERVICE BASED UPON IN-STORE FIELD-OF-VIEW AND ANALYTICS

BACKGROUND

Mobile computing devices such as smartphones and tablet computers have become an integral part of many people's lives. Many people use these devices as an aid for researching, comparing and purchasing products online as well as in physical stores. In fact, some reports indicate that up to 84% of smartphone shoppers utilize their smartphones while in a physical store to, among other things, research product specifications, compare prices and read reviews.

Some application developers have created device applications that leverage augmented reality techniques to further enhance user experiences. Augmented reality techniques utilize a camera to present a live view of a scene and augment the scene with additional information. For example, a navigation application that leverages augmented reality technology may present a live view of a street scene and augment the street scene with address information, directions and/or other navigation information as an overlay to the live images captured by the camera. Other augmented reality applications exist, including some that allow shoppers to get additional information regarding products within a store.

Although augmented reality provides a fun and useful tool for users to receive information in a real-world context, many users find it can be cumbersome to hold up their device to view the live scene captured by the camera and the contextual information that augments the live scene. This may result in many users fleeting use of augmented reality applications. Without augmented reality, however, a user's field-of-view, as approximated through the device camera, is lost and information that might be contextually relevant becomes more difficult to ascertain and present to the user.

SUMMARY

Concepts and technologies disclosed herein are directed to aspects of customer service based upon in-store field-of-view and analytics. According to one aspect disclosed herein, a store analytics system can collect user information associated with a plurality of users located within an environment. The store analytics system also can collect user device information associated with a plurality of user devices associated with the plurality of users. The store analytics system also can collect estimated fields-of-view associated with the plurality of users. The store analytics system can analyze the user information, the user device information, and the estimated fields-of-view to identify at least one commonality shared among at least two of the plurality of users. The store analytics system can create a logical group. The logical group can include the at least two users of the plurality of users that share the commonality.

In some embodiments, the store analytics system can generate an offer directed to the logical group. The store analytics system can send the offer to the logical group. The store analytics system can send the offer to each user device of the plurality of user devices that is associated with a member of the logical group. The store analytics system can send the offer to a signage for presentation of the offer to the logical group.

In some embodiments, the store analytics system can collect traffic pattern data associated with a traffic pattern of the logical group. The store analytics system can generate a notification message to instruct customer service personnel to accommodate members of the logical group. The store analytics system can send the notification message to the customer service personnel.

In some embodiments, the store analytics system can instruct a remote agent to provide assistance to members of the logical group. The remote agent can be a human agent. The remote agent alternatively can be a virtual agent.

In some embodiments, the store analytics system can generate a message directed to a member of a social network platform. The message can instruct the member of the social network platform to provide assistance to the logical group. The store analytics system can send the message to the member of the social network platform.

It should be appreciated that the above-described subject matter may be implemented as a computer-controlled apparatus, a computer process, a computing system, or as an article of manufacture, such as a computer-readable storage medium. These and various other features will be apparent from a reading of the following Detailed Description and a review of the associated drawings.

Other systems, methods, and/or computer program products according to embodiments will be or become apparent to one with skill in the art upon review of the following drawings and detailed description. It is intended that all such additional systems, methods, and/or computer program products be included within this description, be within the scope of this disclosure.

DETAILED DESCRIPTION

The following detailed description is directed to customer service based upon in-store field-of-view and analytics. More specifically, the following detailed description is directed, at least in part, to determining a user's location and estimating the user's field-of-view within a store to provide valuable information to a store owner and/or operator as well as vendors who sell products in the store. By having information regarding what customers, individually or in aggregate, are looking at, and for how long, the store owner and/or operator can gather valuable information regarding how to interact with a customer, what shopping patterns customers display, and what items and/or advertisements benefit from being near popular products. This information and conclusions that may be drawn from this information can allow the store owner and/or operator to improve customer and vendor relationships.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

Figure 1A:
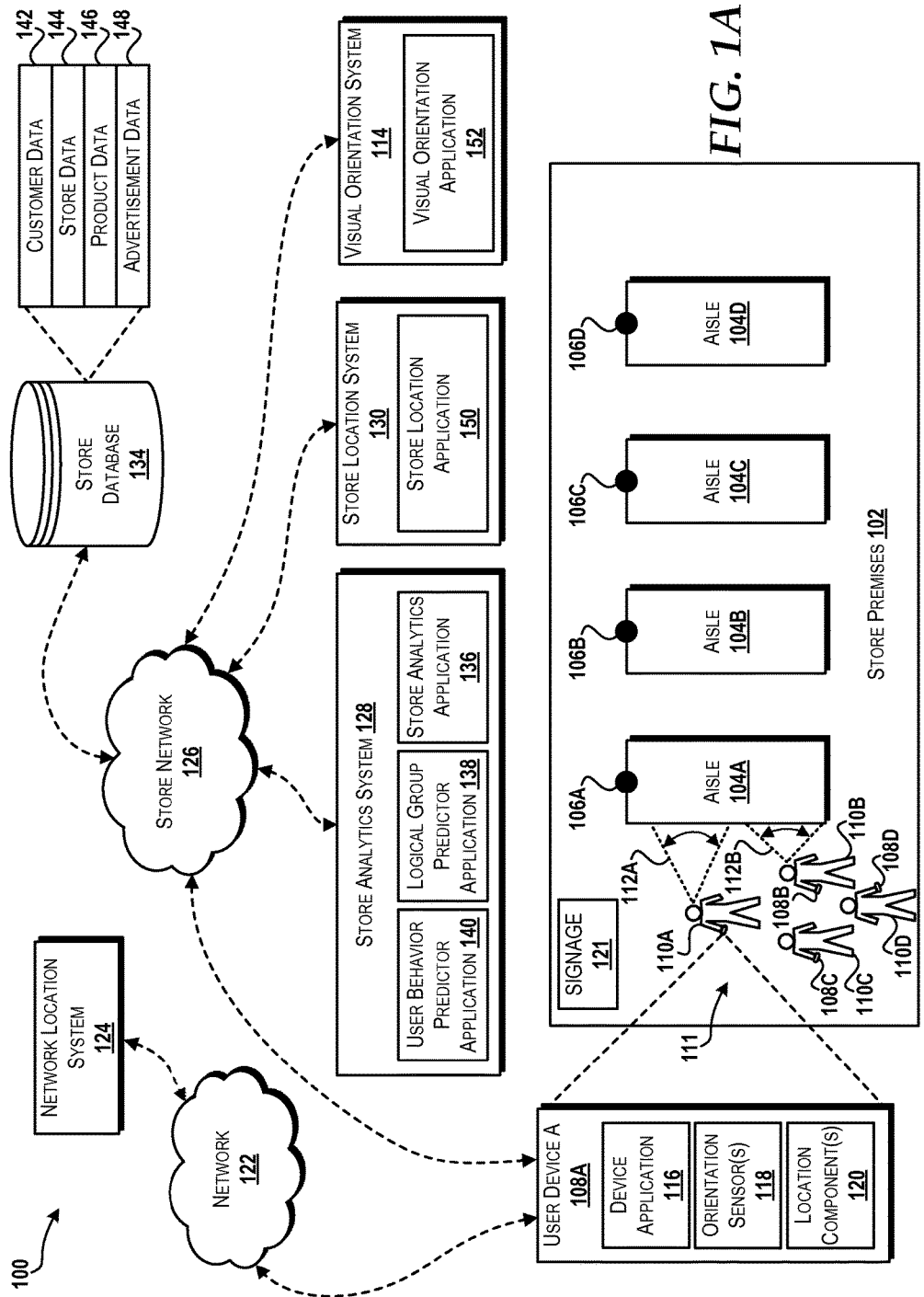
FIGS. 1A-1C are system diagrams illustrating illustrative operating environments for the various embodiments disclosed herein.
Figure 1B:
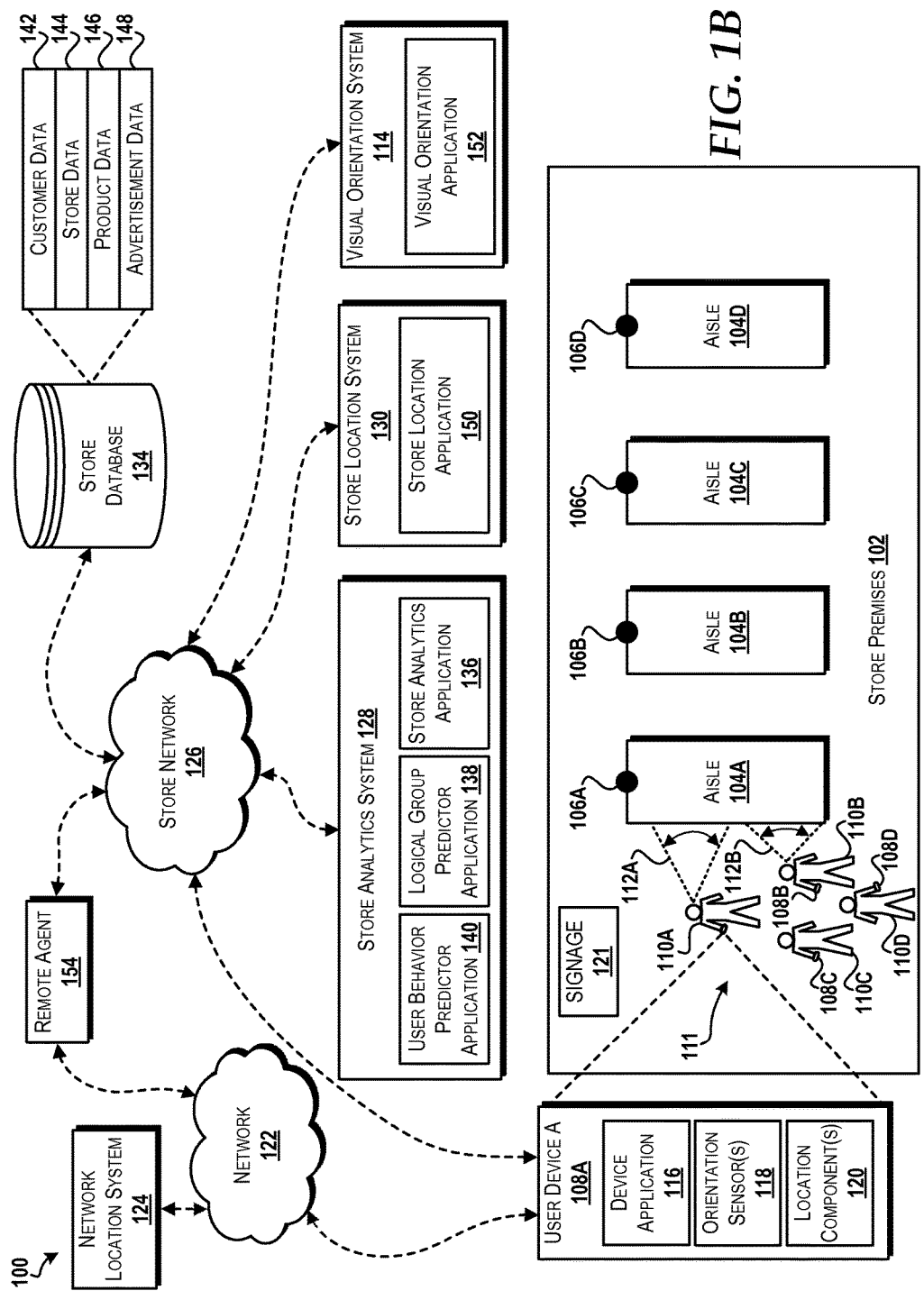
Figure 1C:
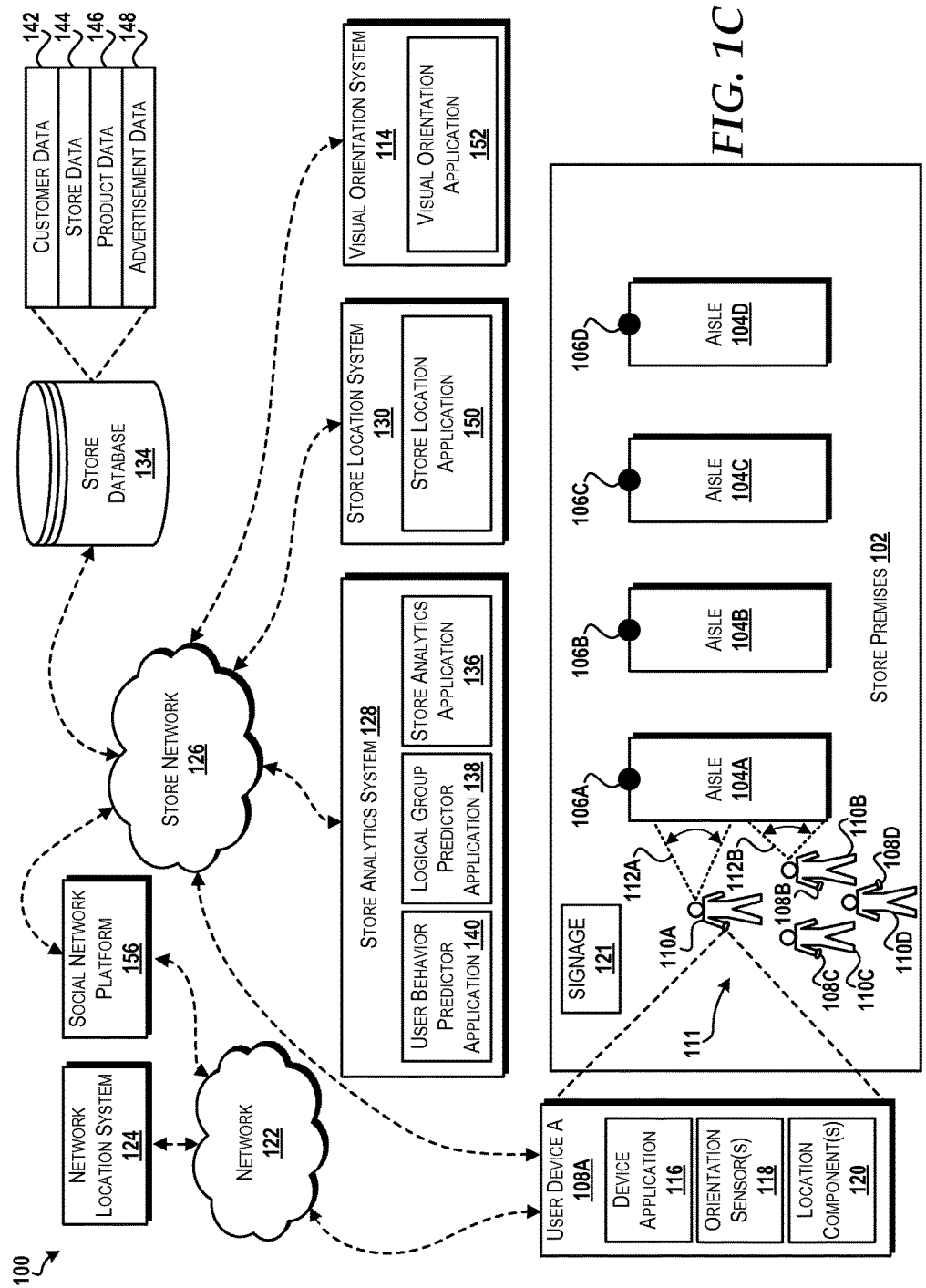

Referring now to FIGS. 1A-1C, aspects of an operating environment 100 for various embodiments of the concepts and technologies disclosed herein will be described. The operating environment 100 shown in FIG. 1A includes a store premises 102 that includes a plurality of aisles 104A-104D in which a plurality of items (not shown) are located. Each of the plurality of aisles 104A-104D is associated with a corresponding one of a plurality of location beacons 106A-106D. The plurality of location beacons 106A-106D can be utilized by one or more user devices 108A-108D associated with one or more users 110A-110D to determine a location of one or more of the user devices 108A-108D, and thus one or more of the users 110A-110D, within the store premises 102.

In the illustrated example, the users 110A-110D form a logical group 111, which, as will be described in greater detail below, can be utilized, in some embodiments, to provide customer service to a group of customers (e.g., the users 110A-110D) who are characterized, at least in part, by one or more commonalities, some examples of which include, but are not limited to, a purpose for his or her visit to the store premises 102, a predominant location or a predicted predominate location within the store premises 102, a predicted duration of visit, a predicted time to checkout, a predicted purchase amount, the like, and combinations thereof. The predicted commonalities can be predicted based, at least in part, upon user history, including, for example, past locations, past durations of visit, past checkout times (e.g., elapsed time within the store premises 102 before checkout or elapsed time during checkout), past purchase amounts, the like, and combinations thereof.

Furthermore, the user A 110A is shown viewing a portion of the aisle 104A, as represented by an actual field-of-view A 112A of the user A 110A. The actual field-of-view A 112A of the user A 110A may include one or more items located on one or more shelves within the aisle 104A. Similarly, the user B 110B is shown viewing another portion of the aisle 104A, as represented by an actual field-of-view B 112B of the user B 110B. The other users—namely, the user C 110C and the user D 110D—also can view portions of the aisle 104A through corresponding actual fields-of view (not shown). As will be described in greater detail below, the actual field-of-view A 112A and the actual field-of-view B 112B of the user A 110A and the user B 110B, respectively, can be estimated by a visual orientation system 114 using orientation and location data provided, in some embodiments, by a device application, such as a device application 116 executing on the user device A 108A. The device application 116 can obtain orientation data from one or more orientation sensors 118. The device application 116 can obtain location data from one or more location components 120. The device application 116, in some embodiments, provide privacy settings that allow users to opt-in to or opt-out of one or more features described herein that utilize, for example, a location, orientation, shopping history, personal information, or other information. The other user devices 108B-108D can include one or more applications similar to the device application 116, one or more orientation sensors similar to the orientation sensor(s) 118, and one or more location components similar to the location component(s) 120. The user device A 108A is used as an example at times in the remaining description, although it should be understood that the user devices 108B-108D may be, at least partially, similarly configured.

The store premises 102 is described, by way of example herein, as a store having a plurality of aisles 104A-104D, each with shelves for displaying products and other items. In some embodiments, products and/or other items may be tagged with static or dynamic pricing displays, such as signage 121. In some embodiments, the signage 121 can display pricing that is particular to one or more of the users 110A-110D or all the users in the logical group 111. By way of example, the store premises 102 may be a home improvement store or a grocery store. These examples are provided merely to aid in describing the concepts and technologies disclosed herein. It should be understood that the store premises 102 alternatively may include any environment in which the field-of-view of a given user is useful. Some example environments include, but are not limited to, outdoor environments, stadiums, tents and other temporary structures, houses and other residential environments, parking garages, commercial buildings, nature trails, outdoor sales events, festivals, concerts, other non-retail environments, and the like.

The user devices 108A-108D, in some embodiments, are mobile devices such as, for example, smartphones, tablet devices, personal digital assistants, laptop computers, or the like. The user devices 108A-108D, in some other embodiments, are wearable devices such as, for example, smart watches, smart glasses, smart jewelry, fitness accessories, or the like. In some other embodiments, the user devices 108A-108D are implanted devices that are implanted within the users 110A-110D. In some other embodiments, the user devices 108A-108D are electronic tattoos. The electronic tattoos may be epidermal electronic sensing ("EES") devices that attach to the skin of the users 110A-110D and contain an array of electronic components for performing various operations of the user devices 108A-108D described herein. In some other embodiments, the user devices 108A-108D are built-in to a shopping cart, shopping basket, or the like, and can be associated with the users 110A-110D upon entry, at checkout, or via other mechanisms.

The user devices 108A-108D, in some embodiments, are in communication with one or more secondary devices, which may be mobile devices, wearable devices, implanted devices, and/or electronic tattoos. Communication between the user devices 108A-108D and the secondary devices can be facilitated by a short-range communications technologies such as, for example, BLUETOOTH, BLUETOOTH low energy ("BLE"), infrared, infrared data association ("IRDA"), near field communications ("NFC"), other RF technologies, or the like. Communication between the user devices 108A-108D and the secondary devices can be facilitated by WI-FI, other wireless technologies, or wired technologies.

The user devices 108A-108D, in the illustrated example, are operating in communication with and/or as part of a communications network ("network") 122. The network 122 can include one or more wireless local area networks ("WLANs"), one or more wireless wide area networks ("WWANS"), one or more wireless metropolitan area networks ("WMANs"), one or more campus area networks ("CANs"), and/or one or more packet data networks (e.g., the Internet). The user devices 108A-108D can communicate with the network 122 using any wireless communications technology or combination of wireless communications technologies, some examples of which include, but are not limited to, WI-FI, Global System for Mobile communications ("GSM"), Code Division Multiple Access ("CDMA") ONE, CDMA2000, Universal Mobile Telecommunications System ("UMTS"), Long-Term Evolution ("LTE"), Worldwide Interoperability for Microwave Access ("WiMAX"), other Institute of Electrical and Electronics Engineers ("IEEE") 802.XX technologies, and the like. The user devices 108A-108D can communicate with the network 122 via various channel access methods (which may or may not be used by the aforementioned technologies), including, but not limited to, Time Division Multiple Access ("TDMA"), Frequency Division Multiple Access ("FDMA"), CDMA, wideband CDMA ("W-CDMA"), Orthogonal Frequency Division Multiplexing ("OFDM"), Single-Carrier FDMA ("SC-FDMA"), Space Division Multiple Access ("SDMA"), and the like. Data can be exchanged between the user devices 108A-108D and the network 122 via cellular data technologies such as, but not limited to, General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. It should be understood that the network 122 may additionally include infrastructure that operates on wired communications technologies, including, but not limited to, optical fiber, coaxial cable, twisted pair cable, and the like to transfer data between various systems operating on or in communication with the network 122. Additional details regarding an illustrative example of the network 122 is illustrated and described with reference to FIG. 15.

The network 122 is illustrated as being in communication with a network location system 124. The network location system 124 can provide to the user devices 108A-108D location information associated with a location of the user devices 108A-108D by leveraging one or more network-based location determining techniques, such as, but not limited to, cellular triangulation, WI-FI triangulation, cell ID, forward link timing, or some combination thereof.

The location of the user devices 108A alternatively or additionally can be determined by the location component(s) 120. In some embodiments, the location component(s) 120 include a global positioning system ("GPS") component. In some other embodiments, the location component(s) 120 include a short-range communications component that can communicate with one or more of the plurality of location beacons 106A-106D to determine the location of the user device A 108A within the store premises 102. In these embodiments, the short-range communications component can utilize BLUETOOTH, BLE, infrared, IRDA, NFC, other RF technologies, other light-based technologies, combinations thereof, and the like to communicate with one or more of the plurality of location beacons 106A-106D to determine the location of the user device A 108A within the store premises 102. Other technologies, including quick response codes, barcodes, three-dimensional barcodes, and the like may be used by the user device A 108A to establish location within the store premises 102. The other user devices 108B-108D may be similarly configured.

The user devices 108A-108D, in the illustrated example, are additionally operating in communication with and/or as part of a store communications network ("store network") 126. The store network 126 can include one or more wireless LANs and may additionally include one or more wired LANs. In some embodiments, the store network 126 includes one or more wireless access points (not shown) that operate in accordance with IEEE 802.11X specifications to provide the user devices 108A-108D wireless connectivity to the store network 126 through which the user devices 108A-108D can communicate with a store analytics system 128, a store location system 130, the visual orientation system 114, and a store database 134. The store analytics system 128, the store location system 130, the visual orientation system 114, and the store database 134 can communicate with each other via the store network 126.

The illustrated store analytics system 128 includes a store analytics application 136, a logical group predictor application 138, and a user behavior predictor application 140. The store analytics application 136, the logical group predictor application 138, and the user behavior predictor application 140 can be stored in a memory or other storage component (best shown in FIG. 14) of the store analytics system 128 and can be executed by one or more processors (also best shown in FIG. 14) of the store analytics system 128 to perform various operations described herein. For example, execution of the store analytics application 136 can cause the store analytics system 128 to interact with one or more of the user devices 108A-108D, the store network 126, the store database 134, the store location system 130, and/or the visual orientation system 114. Some operations performed by the store analytics system 128 will be described immediately below, and others will become apparent from the other FIGURES described herein.

The store analytics application 136 can be executed by one or more processors of the store analytics system 128 to perform operations, such as, for example, measuring, collecting, analyzing, and reporting data associated with the store premises 102, products for sale within the store premises 102, advertisements within the store premises 102, and customers, such as the user A 110A, of the store premises 102. This data can include, for example, customer data 142, store data 144, product data 146, and advertisement data 148 as shown in the store database 134. The store analytics system 128 can save data to the store database 134, retrieve data from the store database 134, delete data from the store database 134, edit data and save edited data to the store database 134, and manipulate data stored within the store database 134.

The customer data 142 can include data associated with one or more customers such as the user A 110A. For example, the customer data 142 can include identity data such as name, birth date, gender, one or more physical addresses, one or more telephone numbers, one or more email addresses, social network information, customer account information including account identifiers and/or user identifiers, and/or job information. The customer data 142 can additionally or alternatively include quantitative data, such as, for example, transactional information such as the number of products purchased, details regarding the products purchased, value of products purchased, and product return history; communication information such as communication date, communication channel (e.g., telephone, email or social network) and communication subject; online activity such as website visits, product views, online registration information, and social network activity including posts, likes, and other social network interactions; and customer service information such as customer complaint details and customer inquiry details. The customer data 142 can additionally or alternatively include descriptive data, such as, for example, marital status, number of children, age of children, property type, car type, number of car doors, number and type of pets, annual income, profession, education level, and the like. The customer data 142 can additionally or alternatively include qualitative data, such as, for example, attitudinal information regarding how customers rate customer service, the value of a product, and the likelihood of purchasing a product again; opinion information regarding customer's favorite colors, favorite vacation locations, and other personal opinions; and motional information regarding why a product was purchased (e.g., personal use, business use or as a gift), one or more reasons for purchasing a product (e.g., locality, brand, price, and/or quality). The customer data also can include permission and suppression preferences. It should be understood that the customer data 142 can include any combination of the aforementioned data and other data associated with a customer that is not specified herein.

The store data 144 can include data associated with various aspects of the store premises 102. For example, the store data 144 can include dimensions of the store premises 102, a layout of the store premises 102, the location of each of the plurality of aisles 104A-104D and/or other areas (e.g., departments, restrooms, customer service, cashiers, and the like) within the store premises 102, and the location of each of the plurality of location beacons 106A-106D. It should be understood that the store data 144 can include any combination of the aforementioned data and other data associated with the store premises 102 that is not specified herein.

The product data 146 can include data associated with one or more products available for purchase within the store premises 102. The product data 146 can include, for example, category, title, description, image, uniform resource locator ("URL") for corresponding web page on a website associated with the store premises 102, stock keeping unit ("SKU"), universal product code ("UPC"), shelf-life, wholesale price, retail price, location within the store premises 102, quantity-on-hand, quantity-on-order, and backorder status. It should be understood that the product data 146 can include any combination of the aforementioned data and other data associated with products that is not specified herein.

The advertisement data 148 can include data associated with one or more advertisements on display, previously on display or scheduled to be on display within the store premises 102. The advertisement data 148 can include identifiers that map to products for which data is stored as part of the product data 146 and for which one or more advertisements are available. The advertisement data 148 can additionally include advertisement category, advertisement title, advertisement description, advertisement price, advertisement restrictions, advertisement start date, and/or advertisement expiration date. It should be understood that the advertisement data 148 can include any combination of the aforementioned data and other data associated with products that is not specified herein.

It is contemplated that the store database 134 can store other data that does not fall into one or more of the aforementioned data categories. As such, the inclusion of the aforementioned data categories in the store database 134 should not be construed as being limiting in any way.

The user behavior predictor application 140 can be executed by one or more processors of the store analytics system 128 to determine behavior patterns of one or more users, such as the users 110A-110D. The behavior patterns can include time of day, day of week, duration, locations visited within the store premises 102, items viewed, items purchased, customer service interactions, method of payment, purchase amounts, and/or any other information, such as any of the customer data 142, aggregated over time to generate the behavior patterns of one or more users. The behavior patterns can be utilized by the user behavior predictor application 140 to predict the behavior of one or more users once the user(s) is located within the store premises 102.

The logical group predictor application 138 can be executed by one or more processors of the store analytics system 128 to perform operations. The logical group predictor application 138 can utilize user information such as, but not limited to, the customer data 142 and/or user behavior patterns for a plurality of user located within the store premises 102, user device information associated with the devices of the users, and/or estimated fields-of-view of the users to identify at least one commonality shared among the users. In the illustrated example, the users 110A-110D form a logical group 111, which, can be utilized, in some embodiments, to provide customer service to a group of customers (e.g., the users 110A-110D) who are characterized, at least in part, by one or more commonalities, some examples of which include, but are not limited to, a purpose for his or her visit to the store premises 102, a predominant location or an predicted predominate location within the store premises 102, a predicted duration of visit, a predicted time to checkout, a predicted purchase amount, the like, and combinations thereof. The predicted commonalities can be predicted based, at least in part, upon user history, including, for example, past locations, past durations of visit, past checkout times (e.g., elapsed time within the store premises 102 before checkout or elapsed time during checkout), past purchase amounts, the like, and combinations thereof.

The store location system 130 includes a store location application 150. The store location application 150 can be stored in a memory or other storage component (best shown in FIG. 14) of the store location system 130 and can be executed by one or more processors (also best shown in FIG. 14) of the store location system 130 to perform various operations described herein. For example, execution of the store location application 150 can cause the store location system 130 to communicate with one or more of the plurality of location beacons 106A-106D to determine a location of a user device such as the user device A 108A, and in this manner also a user such as the user A 110A, within the store premises 102. The store location system 130 alternatively or additionally can rely on network information from the store network 126 to triangulate the location of the user device A 108A. Other indoor location determining techniques may be utilized to determine the location of the user device A 108A within the store premises 102.

The visual orientation system 114 includes a visual orientation application 152. The visual orientation application 152 can be stored in a memory or other storage component (best shown in FIG. 14) of the visual orientation system 114 and can be executed by one or more processors (also best shown in FIG. 14) of the visual orientation system 114 to perform various operations described herein. For example, execution of the visual orientation application 152 can cause the visual orientation system 114 to determine an estimated field-of-view of the user A 110A based upon an orientation and a location of the user device A 108A at a given time, as will be described in greater detail herein below with reference to FIG. 3.

Turning now to FIG. 1B, the operating environment 100 first introduced in FIG. 1A is again shown in FIG. 1B. Also shown in the operating environment of FIG. 1B is a remote agent 154. The remote agent 154 is illustrated as being in communication with the network 122 and the store network 126. In some embodiments, the remote agent 154 includes one or more application servers and/or other software and/or hardware to provide remote assistance to one or more customers via a human agent and/or a virtual agent who may or may not be associated with the store premises 102, an owner of the store premises 102, an operator of the store premises 102, and/or one or more vendors associated with the store premises 102.

The remote agent 154 can receive a customer's estimated field-of-view form the visual orientation system 114, a customer's store location from the store location system 130, and other data, including, for example, at least a portion of the customer data 142, the store data 144, the product data 146, the advertisement data 148, user behavior, user logical group association, combinations thereof, and the like from the store analytics system 128. The remote agent 154 can utilize at least a portion of the aforementioned data to predict the interest(s) and/or need(s) of the customer. Alternatively, the remote agent 154 can receive predicted interest(s) and/or need(s). In either implementation, based upon the predicted interest(s) and/or need(s) of the customer, the remote agent 154 can assist the customer.

In the illustrated embodiment, the remote agent 154 provides assistance to customers via a connection established with a user device associated with the customer, such as the user device A 108A associated with the user A 110A, via the network 122 or the store network 126. In other embodiments, the remote agent 154 is provided as an application to a user device associated with the customer, such as the user device A 108A associated with the user A 110A, via the network 122 or the store network 126. The remote agent 154, in these embodiments, can be executed by one or more processors of the user device to provide automated assistance via a virtual agent and/or can initiate communication with a human agent via the network 122 and/or the store network 126.

Turning now to FIG. 1C, the operating environment 100 first introduced in FIG. 1A is again shown in FIG. 1C. Also shown in the operating environment of FIG. 1C is a social network platform 156. The social network platform 156 is illustrated as being in communication with the network 122 and the store network 126. In some embodiments, the social network platform 156 is or includes one or more platforms as a service ("PaaS"). In some embodiments, the social network platform 156 includes one or more application servers and/or other software and/or hardware to provide one or more social network services.

The social networking services can include, but are not limited to, services for sharing or posting status updates, instant messages, links, photos, videos, and/or other information; services for commenting or displaying interest in articles, products, blogs, or other resources; and/or other services. In some embodiments, the social network platform 156 provides, at least in part, the FACEBOOK social networking service, the LINKEDIN professional networking service, the MYSPACE social networking service, the FOURSQUARE geographic networking service, the YAMMER office colleague networking service, and the like. In other embodiments, the social networking platform 156 provides other services, sites, and/or providers that may or may not explicitly be known as social networking providers. For example, some web sites allow users to interact with one another via email, chat services, and/or other means during various activities and/or contexts such as reading published articles, commenting on goods or services, publishing, collaboration, gaming, and the like. Examples of such services include, but are not limited to, the WINDOWS LIVE service and the XBOX LIVE service from Microsoft Corporation in Redmond, Wash. Other services are possible and are contemplated.

The social networking services also can include commenting, blogging, and/or microblogging services. Examples of such services include, but are not limited to, the YELP commenting service, the KUDZU review service, the OFFICETALK enterprise microblogging service, the TWITTER messaging service, the GOOGLE BUZZ service, and/or other services. It should be appreciated that the above lists of services are not exhaustive and that numerous additional and/or alternative social networking services are not mentioned herein for the sake of brevity. As such, the above embodiments are illustrative, and should not be construed as being limiting in any way.

In some embodiments, the social network platform 156 receives a customer's estimated field-of-view from the visual orientation system 114 and utilizes the estimated field-of-view to determine one or more items the customers has an interest in. The social network platform 156 can generate one or more offers directed to one or more members of the social network platform 156. The social network platform 156 can provide the offer(s) to the member(s) via, for example, an interface provided via the social network platform 156.

An offer can be or can include an opportunity for the member(s) to provide assistance to the customer with regard to the item(s) the customer has an interest in as determined based upon the customer's estimated field-of-view. The member(s) can provide assistance via audio, video, text, messaging, telephone call, video call, or other communications, including real-time, near-real-time, through a connection established between the social network platform 156 and a user device associated with the customer, such as the user device A 108A associated with the user A 110A. In some embodiments, an offer includes one or more incentives to incentivize the member(s) to assist the customer.

An incentive can be or can include employee incentives such as if the member(s) is/are employed by the store owner and/or operator or by one or more vendors who sell the item(s) the customer is interested in. An incentive can be a consumer incentive provided by the store owner and/or operator and/or one or more by one or more vendors who sell the item(s) the customer is interested in. Incentives can be cash, merchandise, gift cards/certificates, travel, experiential, vacation time, points towards a points program, combinations thereof, and the like. Other incentives are contemplated, and therefore the aforementioned examples should not be construed as limiting in any way.

The member(s) of the social network platform 156 to which an offer is sent can be determined based, at least in part, upon the member(s) identifying themselves of having knowledge of the item(s) the customer is interested in. It is contemplated that members with greater knowledge may receive more offers than those with lesser knowledge, although members may have an equal opportunity to provide their assistance. The member(s) of the social network platform 156 can opt-in to providing assistance and may be incentivized just for opting-in. Additional details regarding aspects of the social network platform 156 will be described below with reference to FIG. 12.

Figure 2:
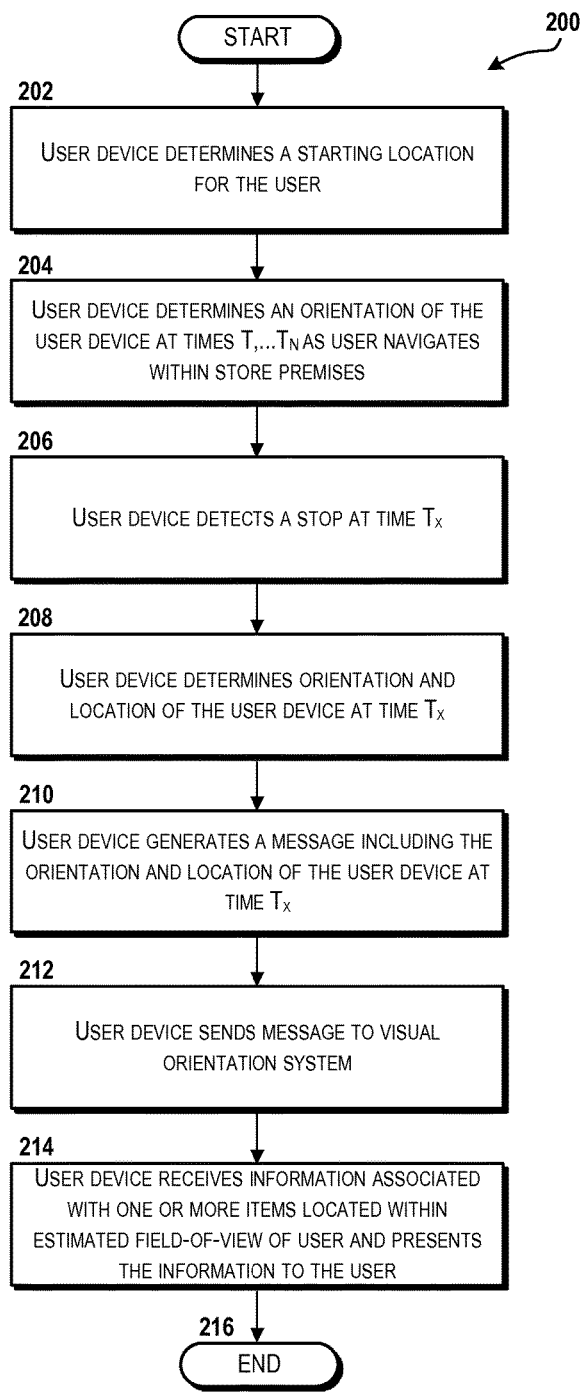
FIG. 2 is a flow diagram illustrating aspects of a method for determining an estimated field-of-view of a user from the perspective of a user device, according to an illustrative embodiment.

Turning now to FIG. 2, a method 200 for determining an estimated field-of-view of the user A 110A from the perspective of the user device A 108A will be described, according to an illustrative embodiment. The other user devices 108B-108D can perform similar methods to determine an estimated field-of-view of the users 110B-110D, respectively. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing a processor of a computing system or device, such as, for example, one or more of the plurality of beacons 106A-106D, one or more of the user devices 108A-108D, the network location system 124, the store analytics system 128, the store location system 130, or the visual orientation system 114 to perform one or more operations and/or causing the processor to direct other components of the computing system or device to perform one or more of the operations.

For purposes of illustrating and describing the concepts of the present disclosure, operations of the methods disclosed herein are described as being performed by one or more of the user devices 108A-108D, the network location system 124, the store analytics system 128, the store location system 130, the visual orientation system 114, or the store database 134 alone or in combination via execution of one or more software modules such as, for example, the device application 116, the store analytics application 136, the logical group predictor application 138, the user behavior predictor application 140, the store location application 150, the visual orientation application 152, and/or other software/firmware components described herein. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 200 will be described as being performed by the user device A 108A with reference to FIGS. 1A and 2. The method 200 begins and proceeds to operation 202, where the user device A 108A determines a starting location for the user A 110A based upon the location of the user device A 108A. In some embodiments, the location component 120, embodied as a GPS component, acquires a GPS fix for the user device A 108A. In some embodiments, the location component 120, embodied as a short-range communications component, acquires location information from one or more of the plurality of beacons 106A-106D. In these embodiments, the location information may identify the location of one or more of the plurality of beacons 106A-106D, or alternatively the location information may be used by the user device A 108A in a query to the store location system 130 to acquire the location of the user device A 108A. In some other embodiments, the user device A 108A receives location information directly from the store location system 130, which may determine the location of the user device A 108A via WI-FI triangulation and/or beacon triangulation techniques, for example. In some other embodiments, the user device A 108A receives location information from the network location system 124.

From operation 202, the method 200 proceeds to operation 204, where the user device A 108A determines an orientation of the user device A 108A at various times. More particularly, the orientation sensor(s) 118, embodied as a gyroscope, an accelerometer, a compass, a gyrocompass, and/or the like, for example, can determine the orientation of the user device A 108A and the direction of movement of the user device A 108A as the user A 110A navigates through the store premises 102. As the user A 110A navigates through the store premises 102, the device application 116 can request sensor output from the orientation sensor(s) 118 at times $T_1 \ldots T_n$. The sensor output can be used by the device application 116 to determine the orientation of the user device A 108A at times $T_1 \ldots T_n$.

In addition, or in the alternative, the orientation of the user device A 108A can be determined based upon parameters such as, but not limited to, gait, pace, speed, and/or direction of the user A 110A as measured by the user device A 108A. For example, a person walking down an aisle may exhibit different motion characteristics than a person stepping sideways in front of a display, or stepping up a stair, or walking up a ramp, or pushing a cart. Such motion characteristics can help confirm a person's rotational position relative to the user device A 108A. After a person's rotational position relative to the user device A 108A is ascertained, the orientation sensor(s) 118 in the user device A 108A can be used to determine changes.

From operation 204, the method 200 proceeds to operation 206, where the user device A 108A uses the orientation sensor(s) 118 to detect that the user device A 108A has stopped at time $T_x$. For example, an accelerometer output may indicate no movement or movement below a pre-defined movement threshold that is indicative of the user device A 108A being stopped. From operation 206, the method 200 proceeds to operation 208, where the user device A 108A determines an orientation of the user device A 108A at time $T_x$. In particular, the device application 116 can request sensor output from a gyroscope of the orientation sensor(s) 118 at time $T_x$. Additionally, at operation 206, the user device A 108A determines the location of the user device A 108A at time $T_x$. In some embodiments, the location component 120, embodied as a GPS component, acquires a GPS fix for the user device A 108A. In some embodiments, the location component 120, embodied as a short-range communications component, acquires location information from one or more of the plurality of beacons 106A-106D. In these embodiments, the location information may identify the location of one or more of the plurality of beacons 106A-106D, or alternatively the location information may be used by the user device A 108A in a query to the store location system 130 to acquire the location of the user device A 108A. In some other embodiments, the user device A 108A receives location information directly from the store location system 130, which may determine the location of the user device A 108A via WI-FI triangulation and/or beacon triangulation techniques, for example. In some other embodiments, the user device A 108A receives location information from the network location system 124. In some other embodiments, the user device A 108A uses the starting location determined at operation 202 and data obtained from the orientation sensor(s) 118 to estimate the distance traveled by the user A 110A from the starting location.

From operation 208, the method 200 proceeds to operation 210, where the user device A 108A generates a message. The message can include the orientation of the user device A 108A and the location of the user device A 108A at time $T_x$ as determined at operation 206. From operation 210, the method 200 proceeds to operation 212, where the user device A 108A sends the message to the visual orientation system 114. In response, at operation 214, the user device A 108A receives information associated with one or more items that are located within an estimated field-of-view of the user A 110A and presents the information to the user A 110A via a display, speakers or other output component (not shown) of the user device A 108A. The visual orientation system 114 can determine the estimated field-of-view of the user A 110A within varying accuracy to the actual field-of-view 112A of the user A 110A.

In some embodiments, the information includes additional information about the item(s) estimated by the visual orientation system 114 to be within the actual field-of-view 112A of the user A 110A. The additional information can include, for example, any of the product data 146 associated with the item(s) estimated by the visual orientation system 114 to be within the actual field-of-view 112A of the user A 110A. In addition, or in the alternative, the additional information can include, for example, any of the advertisement data 148 associated with the item(s) estimated by the visual orientation system 114 to be within the actual field-of-view 112A of the user A 110A.

In some other embodiments, the information includes customer service information regarding the item(s) estimated by the visual orientation system 114 to be within the actual field-of-view 112A of the user A 110A. In this manner, customer service personnel can offer, via text, audio and/or video communications established via the store network 126, to assist the user A 110A with the item(s) estimated by the visual orientation system 114 to be within the actual field-of-view 112A of the user A 110A. The customer service personnel may be real or virtual. The customer service personnel may be located within the store premises 102 or remote. Additional details regarding interactions between customer service personnel and the user A 110A will be described below with reference to FIG. 6.

The estimated field-of-view is determined by the visual orientation system 114 as will be described in greater detail below with reference to FIG. 3. The estimated field-of-view can be utilized by the store analytics system 128 to determine one or more items that are estimated to be visible to the user A 110A. Over time through the analysis of estimated fields-of-view of a plurality of customers navigating through the store premises 102, the store analytics system 128 can determine what items customers are viewing, how long customers are viewing those items, and whether advertisements for customers translated into sales, among other metrics that may be useable by an owner and/or operator of the store premises 102, an item manufacturer, an item distributor, an item advertiser, and/or other entities. Metrics such as those described above may be used by an owner and/or operator of the store premises 102, an item manufacturer, an item distributor, an item advertiser, and/or other entities for item placement decisions, marketing strategies, events, sales performance analysis, and other uses. It is contemplated that metrics from the store premises 102 can be aggregated with metrics from one or more additional stores. This aggregate data can be analyzed to determine which stores are performing better with respect to specific product visibility and/or advertisement effectiveness. Metrics from the store premises 102 and/or additional stores may be presented via a software dashboard so that provides a real-time data view and/or a historical data view to determine how many customers view a particular product or advertisement within a particular time period such as now, this week, last week, last month, the last year, or any other time period, which may be pre-defined or defined on-the-fly.

In some other embodiments, the information includes recalled information. Recalled information can include any information previously presented to the user A 110A when the current estimated field-of-view matches a previous estimated field-of-view. A match may be an exact match or an approximated match. In some embodiments, the recalled information provides the user A 110A with information associated with the previous estimated field-of-view and may be compared to information associated with the current estimated field-of-view. In this manner, the user A 110A can be presented with information reminiscent of past and present for a particular field-of-view. The past information may contain information not previously presented to the user A 110A but derived from a common database. The common database may be or may include data such as stored in the store database 134, or the common database may be an image or video of the user's estimated field-of-view from some time in the past. The latter may be useful for a number of types of applications, such as to show a product distributor what their shelf placement used to look like before an improvement and then after. Or, in a different manner, the view of a past version of a predicted field-of-view may enable a user to view what an external environment looked like at some time in the past, for instance, to compare an external environment before and after the completion of a construction project.

From operation 214, the method 200 proceeds to operation 216. The method 200 ends at operation 216.

In some embodiments, the orientation, location, and/or field-of-view can be validated by the user A 110A through the device application 116. For example, the device application 116 may elicit a response from the user A 110A to a coupon, discount offer, promotion, or other prompt to validate the orientation, location, and/or field-of-view of the user A 110A.

Figure 3:
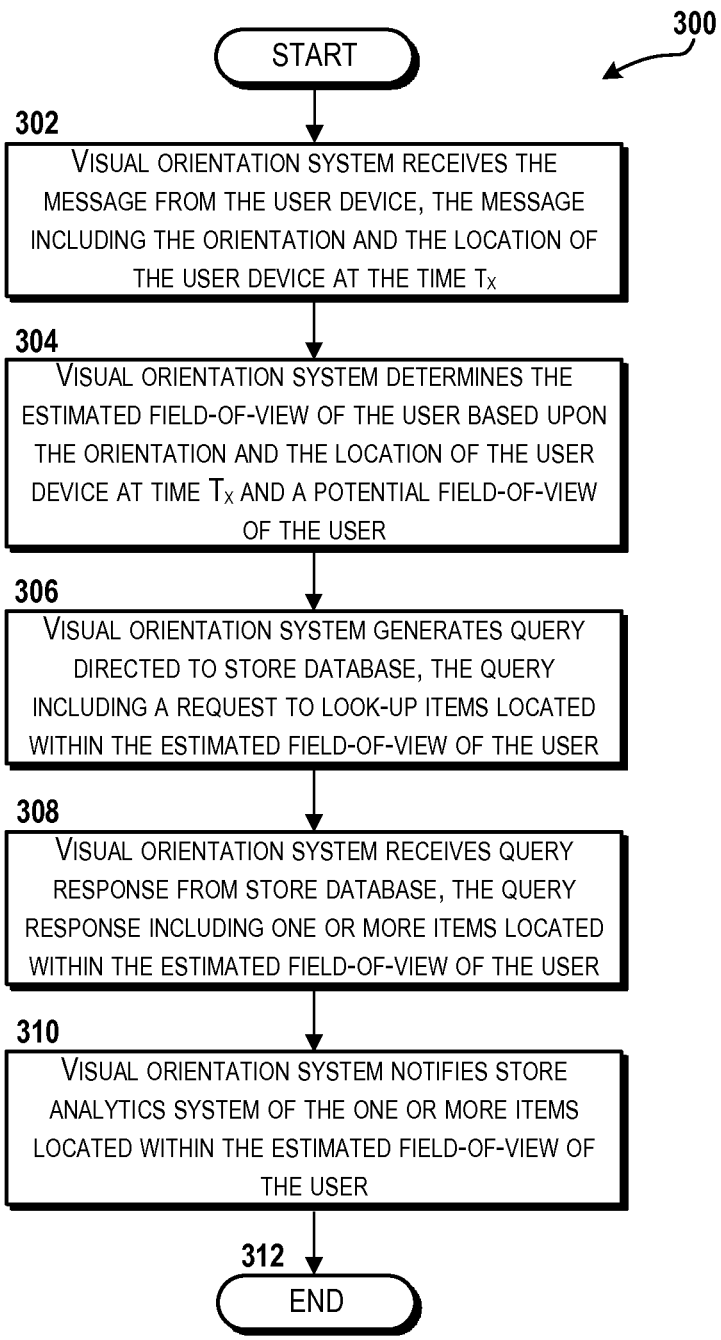
FIG. 3 is a flow diagram illustrating aspects of a method for determining an estimated field-of-view of a user from the perspective of a visual orientation system, according to an illustrative embodiment.

Turning now to FIG. 3, a method 300 for determining an estimated field-of-view of the user A 110A from the perspective of the visual orientation system 114 will be described, according to an illustrative embodiment. The method 300 will be described as being performed by the visual orientation system 114 with reference to FIGS. 1A and 3. Although the method 300 is described from the perspective of the visual orientation system 114 communicating with the user device A 108A, similar methods can be performed with the other user devices 108B-108D.

The method 300 begins and proceeds to operation 302, where the visual orientation system 114 receives the message generated by the user device A 108A at operation 210 of the method 200 described above. From operation 302, the method 300 proceeds to operation 304, where the visual orientation system 114 determines the estimated field-of-view of the user A 110A based upon the orientation and the location of the user device A 108A at time $T_x$ and a potential field-of-view of the user A 110A. The potential field-of-view of the user A 110A is the visual field that the user A 110A is physically capable of viewing when unobstructed. The potential field-of-view may be obtained from the customer data 142 stored in the store database 134 or may be included by the user device A 108A in the message received at operation 302. Using the orientation and the location of the user device A 108A and the potential field-of-view of the user A 110A, the visual orientation system 114 can determine the estimated field-of-view of the user A 110A and return one or more items located within that location of the store premises 102 and estimated to be visible to the user A 110A based upon the orientation of the user device A 108A (i.e., which direction the user A 110A is facing) and area viewable to the user A 110A based upon the user's potential field-of-view.

From operation 304, the method 300 proceeds to operation 306, where the visual orientation system 114 generates a query directed to the store database 134. The query can include a request to look-up items located within the estimated field-of-view of the user A 110A. From operation 306, the method 300 proceeds to operation 308, where the visual orientation system 114 receives a query response from the store database 134. The query response can include one or more items that are located within the estimated field-of-view of the user A 110A. From operation 308, the method 300 proceeds to operation 310, where the visual orientation system 114 notifies the store analytics system 128 of the one or more items located within the estimated field-of-view of the user A 110A.

The one or more items located within the estimated field-of-view of the user A 110A, alone or in aggregate with other estimated fields-of-view, can be used by the store analytics system 128 for analysis to determine what items customers are viewing, how long customers are viewing those items, and whether advertisements for customers translated into sales, among other metrics that may be useable by an owner and/or operator of the store premises 102, an item manufacturer, an item distributor, an item advertiser, and/or other entities. Metrics such as those described above may be used by an owner and/or operator of the store premises 102, an item manufacturer, an item distributor, an item advertiser, and/or other entities for item placement decisions, marketing strategies, events, sales performance analysis, and other uses. For instance, a store operator may be able to make determinations about which products or which locations within the store premises 102 get more, or less, "eyeball traffic." With such analytics intelligence, the store operator may be able to upsell item distributors to purchase higher priced shelf space or shelf space in a different location that is nearby other complementary merchandise. Also, the store analytics system 128 may produce data that indicates which products on a user's visual periphery are more likely to have been seen based on the period of time the user A 110A spent at that location.

From operation 310, the method 300 proceeds to operation 312. The method 300 ends at operation 312.

Figure 4:
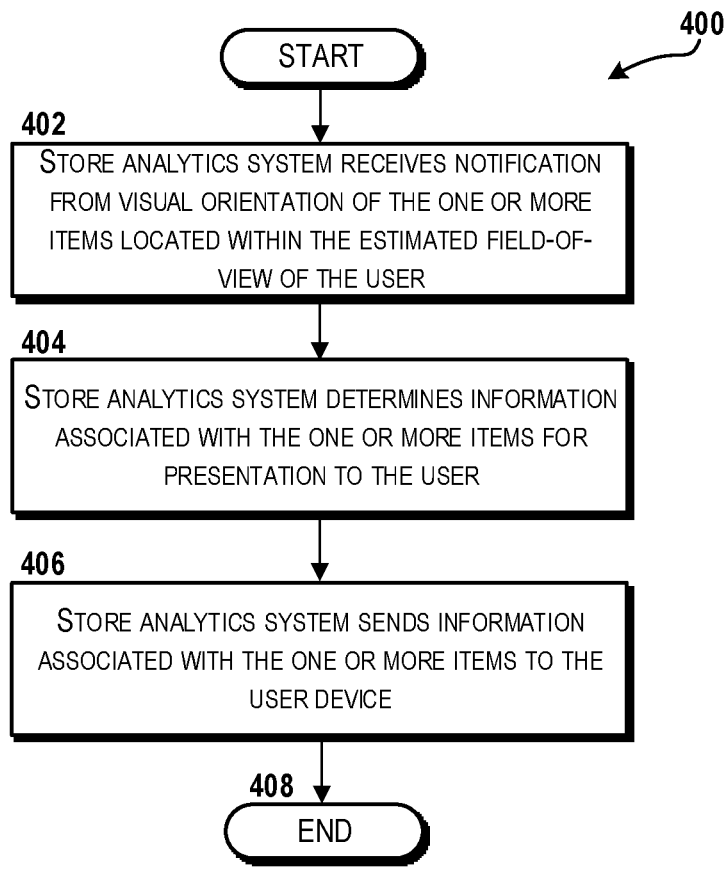
FIG. 4 is a flow diagram illustrating aspects of a method for determining an estimated field-of-view of a user from the perspective of a store analytics system, according to an illustrative embodiment.

Turning now to FIG. 4, a method 400 for determining an estimated field-of-view of the user A 110A from the perspective of the store analytics system 128 will be described, according to an illustrative embodiment. The method 400 will be described as being performed by the store analytics system 128 with reference to FIGS. 1A and 4. Although the method 400 is described from the perspective of the store analytics system 128 communicating with the user device A 108A, similar methods can be performed with the other user devices 108B-108D.

The method 400 begins and proceeds to operation 402, where the store analytics system 128 receives the notification from the visual orientation system 114. From operation 402, the method 400 proceeds to operation 404, where the store analytics system 128 determines information associated with the one or more items for presentation to the user A 110A. From operation 404, the method 400 proceeds to operation 406, where the store analytics system 128 sends the information associated with the one or more items to the user device A 108A.

In some embodiments, the information includes additional information about the item(s) estimated by the visual orientation system 114 to be within the actual field-of-view 112A of the user A 108A. The additional information can include, for example, any of the product data 146 associated with the item(s) estimated by the visual orientation system 114 to be within the actual field-of-view 112A of the user A 108A. Or, the additional information can include, for example, any of the product data 146 associated with the complementary or competing item(s) estimated by the visual orientation system 114 to be within the actual field-of-view 112A of the user A 108A. In addition, or in the alternative, the additional information can include, for example, any of the advertisement data 148 associated with the item(s) estimated by the visual orientation system 114 to be within the actual field-of-view 112A of the user A 108A.

In some other embodiments, the information includes customer service information regarding the item(s) estimated by the visual orientation system 114 to be within the actual field-of-view 112A of the user A 108A. In this manner, customer service personnel can offer, via text, audio and/or video communications established via the store network 126, to assist the user A 110A with the item(s) estimated by the visual orientation system 114 to be within the actual field-of-view A 112A of the user A 108A. The customer service personnel may be real or virtual. The customer service personnel may be located within the store premises 102 or remote.

From operation 406, the method 400 proceeds to operation 408. The method 400 ends at operation 408.

Figure 5:
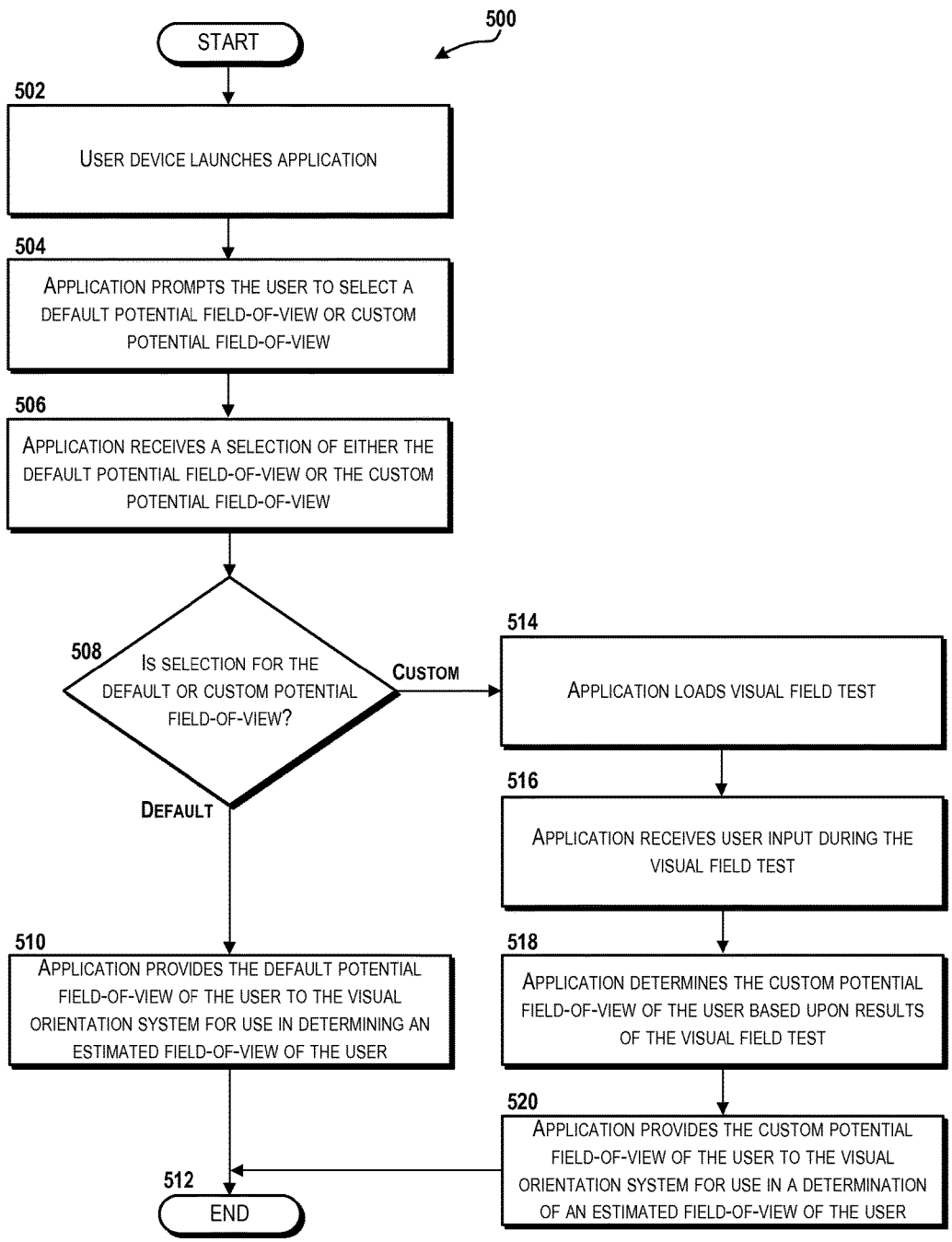
FIG. 5 is a flow diagram illustrating aspects of a method for establishing a potential field-of-view of a user, according to an illustrative embodiment.

Turning now to FIG. 5, a method 500 for establishing a potential field-of-view of the user A 110A will be described, according to an illustrative embodiment. The method 500 will be described from the perspective of the user device A 108A executing, via one or more processors, the device application 116. Although the method 500 is described from the perspective of the user device A 108A, similar methods can be performed by the other user devices 108B-108D.

The method 500 begins and proceeds to operation 502, where the user device A 108A launches the device application 116. From operation 502, the method 500 proceeds to operation 504, where the device application 116 prompts the user A 110A to select a default potential field-of-view or a custom potential field-of-view to be used by the visual orientation system 114 for determining which item(s), if any, are visible to the user A 110A for a given location and orientation within the store premises 102. From operation 504, the method 500 proceeds to operation 506, where the device application 116 receives a selection of either the default potential field-of-view or the custom potential field-of-view. From operation 506, the method 500 proceeds to operation 508, where the device application 116 determines whether the selection received at operation 506 is for the default potential field-of-view or for the custom potential field-of-view.

If, at operation 508, the device application 116 determines that the selection received at operation 506 is for the default potential field-of-view, the method 500 proceeds from operation 508 to operation 510. At operation 510, the device application 116 provides the default potential field-of-view of the user A 110A to the visual orientation system 114 for use in determining an estimated field-of-view of the user A 110A.

The default potential field-of-view can be defined as a normal visual field. In some embodiments, the normal visual field is defined in accordance with optometry and ophthalmology standards for the normal human visual field, and as such, may be updated from time-to-time. For example, the normal human visual field is defined as an island of vision measuring 90 degrees temporally to central fixation, 50 degrees superiorly and nasally, and 60 degrees inferiorly. Likewise, an abnormal field of vision may be defined as a depression or absence of vision anywhere in the island of vision. The user A 110A may select the default potential field-of-view if he or she knows, based upon a vision assessment, that his or her visual field is normal. The user A 110A may select the default potential field-of-view if he or she does not want to customize his or her potential field-of-view with the understanding that the visual orientation system 114 may therefore determine which item(s), if any, are visible to the user A 110A for a given location and orientation within the store premises 102 with decreased accuracy. In some embodiments, the visual orientation system 114 can determine the estimated field-of-view of the user A 110A based upon the location and orientation of the user device, without the potential field of view.

From operation 510, the method 500 proceeds to operation 512. The method 500 ends at operation 512.

If, at operation 508, the device application 116 determines that the selection received at operation 506 is for the custom potential field-of-view, the method 500 proceeds from operation 508 to operation 514. At operation 514, the device application 116 loads a visual field test. The visual field test, in some embodiments, is a standardized visual field test utilized by optometrists and ophthalmologists to determine a patient's visual field that has been optimized for use on the user device A 108A. For example, the visual field test may utilize a software-based multi-fixation campimeter, such as a version of or the Damato Multi-Fixation Campimeter available from www.testvision.org.

In some embodiments, the visual field test is included as part of the device application 116. In some other embodiments, the visual field test is available via a website accessible by a web browser installed on the user device A 108A. In some other embodiments, the visual field test is available via a web application accessible by the web browser. In some other embodiments, the visual field test is included in another application installed on the user device A 108A. The remaining operations of the method 500 will be described in accordance with an embodiment in which the visual field test is included as part of the device application 116.

From operation 514, the method 500 proceeds to operation 516, where the device application 116 receives user input during the visual field test. From operation 516, the method 500 proceeds to operation 518, where the device application 116 determines the custom potential field-of-view of the user A 110A based upon results of the visual field test. For example, the results of the visual field test may reveal blind spots and/or other abnormalities of the visual field of the user A 110A. These abnormalities can be considered in determining the potential field-of-view of the user. As such, different users may have different custom potential field-of-views and therefore may affect which, if any, items each user may see when viewing an area of the store premises 102 from the same location and orientation. From operation 518, the method 500 proceeds to operation 520, where the device application 116 provides the custom potential field-of-view of the user A 110A to the visual orientation system 114 for use by the visual orientation system 114 in a determination of the estimated field-of-view of the user A 110A.

From operation 520, the method 500 proceeds to operation 512. The method 500 ends at operation 512.

Figure 6:
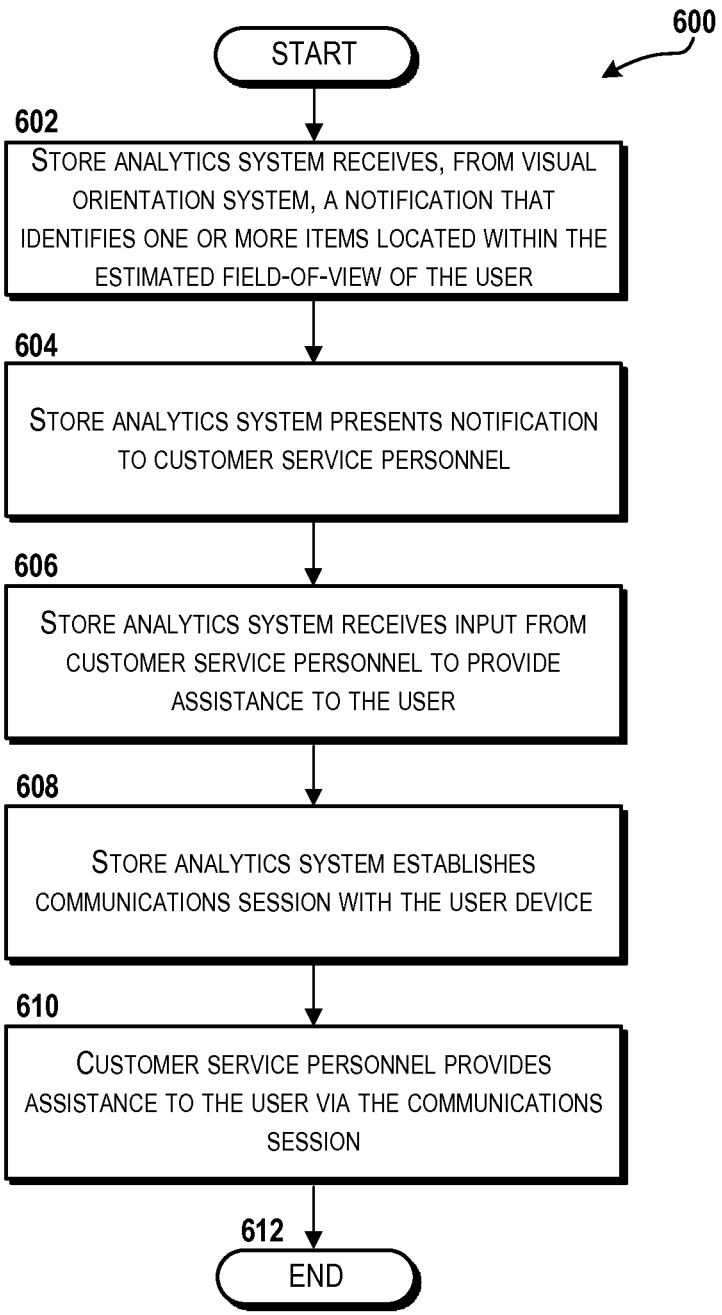
FIG. 6 is a flow diagram illustrating aspects of a method for using an estimated field-of-view of a user to provide customer service, according to an illustrative embodiment.

Turning now to FIG. 6, a method 600 for using an estimated field-of-view of the user A 110A to provide customer service will be described, according to an illustrative embodiment. Although the method 600 is described from the perspective of the store analytics system 128 communicating with the user device A 108A, similar methods can be performed with the other user devices 108B-108D.

The method 600 begins and proceeds to operation 602, where the store analytics system 128 receives a notification from the visual orientation system 114. The notification can identify one or more items within an estimated field-of-view of the user A 110A. From operation 602, the method 600 proceeds to operation 604, where the store analytics system 128 presents the notification to one or more customer service personnel.

From operation 604, the method 600 proceeds to operation 606, where the store analytics system 128 receives input from the customer service personnel to provide assistance to the user A 110A. In response, at operation 608, the store analytics system 128 establishes a communications session with the user device A 108A over the store network 126 and/or the network 122, for example. The communications session may be a text-based chat session, a voice session (e.g., VoIP), a video session, or other session by which the customer service personnel can communicate with the user A 110A to provide assistance with regards to any of the one or more items within the estimated field-of-view of the user A 110A.

From operation 608, the method 600 proceeds to operation 610, where the customer service personnel provides assistance to the user A 110A via the communications session. The customer service personnel may assist the user A 110A in locating a particular item which may or may not be within the estimated field-of-view. The customer service personnel may assist the user A 110A with past, present and/or future promotions associated with any of the one or more items within the estimated field-of-view of the user A 110A. The customer service personnel may assist the user A 110A with selecting one or more of the items within the estimated field-of-view of the user A 110A that best suits his or her needs. It should be understood that the aforementioned assistance examples are merely exemplary and should not be construed as being limiting in any way.

From operation 610, the method 600 proceeds to operation 612. The method 600 ends at operation 612.

In some embodiments, the customer service personnel may provide assistance to the user A 110A based upon information obtained from the user device A 108A that may indicate that the user A 110A is having difficulty with some aspects of his or her shopping experience. For example, how long the user A 110A maintains the estimated field-of-view may be indicative of the user A 110A being unable to locate a particular item or the user A 110A is having difficulty deciding which of many items he or she should purchase.

In some other embodiments, the user A 110A may provide input to the user device A 108A to instruct the user device A 108A to initiate the communications session with the store analytics system 128. In these embodiments, the store analytics system 128 may request from the user device A 108A orientation and location information for querying the visual orientation system to determine what, if any, items are located within the estimated field-of-view of the user A 110A so that the customer service personnel can be aware of what it is the user A 110A is currently viewing in order to better assist the user A 110A.

Figure 7:
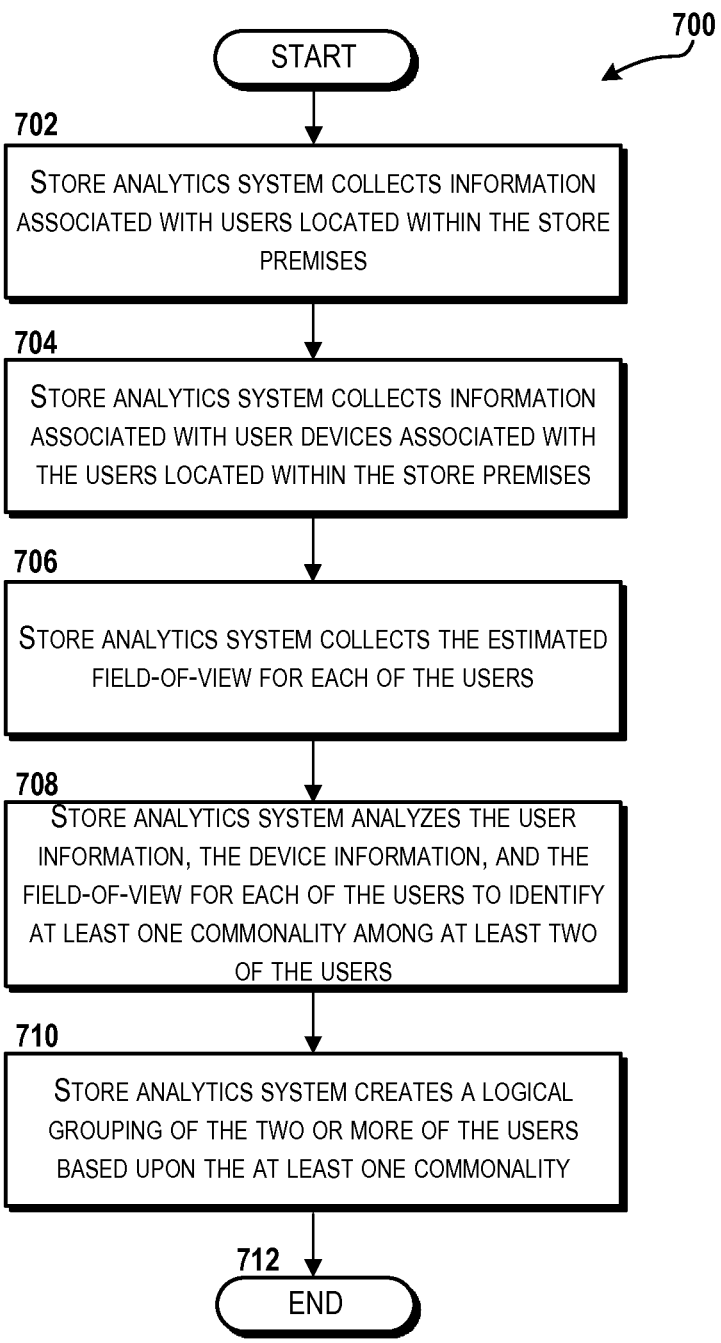
FIG. 7 is a flow diagram illustrating aspects of a method for creating a logical group of users, according to an illustrative embodiment.

Turning now to FIG. 7, a method 700 for creating a logical group of users, such as the logical group 111 will be described, according to an illustrative embodiment. The method 700 will be described as being performed by the store analytics system 128 with reference to FIGS. 1A and 7.

The method 700 begins and proceeds to operation 702, where the store analytics system 128 collects information associated with a plurality of users, such as the users 110A-110D, located within the store premises 102. The information associated with the plurality of users can include any of the user information described herein above, such as the customer data 142. From operation 702, the method 700 proceeds to operation 704, where the store analytics system 128 collects information associated with a plurality of user devices, such as the user devices 108A-108D. The information associated with the plurality of user devices can include any of the device information described herein above, such as device location. The information associated with the plurality of users can include any of the user information described herein above. From operation 704, the method 700 proceeds to operation 706, where the store analytics system collects the estimated field-of-view for each of the users 110A-110D.

From operation 706, the method 700 proceeds to operation 708, where the store analytics system 128 analyzes the user information, the device information, and the field-of-view information for each of the users 110A-110D to identify at least one commonality shared among at least two of the users 110A-110D. A commonality can include, but is not limited to, a purpose for a user's visit to the store premises 102, a predominant location or an predicted predominate location within the store premises 102, a predicted duration of visit, a predicted time to checkout, a predicted purchase amount, the like, and combinations thereof. The predicted commonalities can be predicted based, at least in part, upon user history, including, for example, past locations, past durations of visit, past checkout times (e.g., elapsed time within the store premises 102 before checkout or elapsed time during checkout), past purchase amounts, the like, and combinations thereof. From operation 708, the method 700 proceeds to operation 710, where the store analytics system 128 creates a logical grouping, such as the logical group 111, of two or more of the users 110A-110D based upon the at least one commonality identified at operation 708. From operation 710, the method 700 proceeds to operation 712. The method 700 ends at operation 712.

Figure 8:
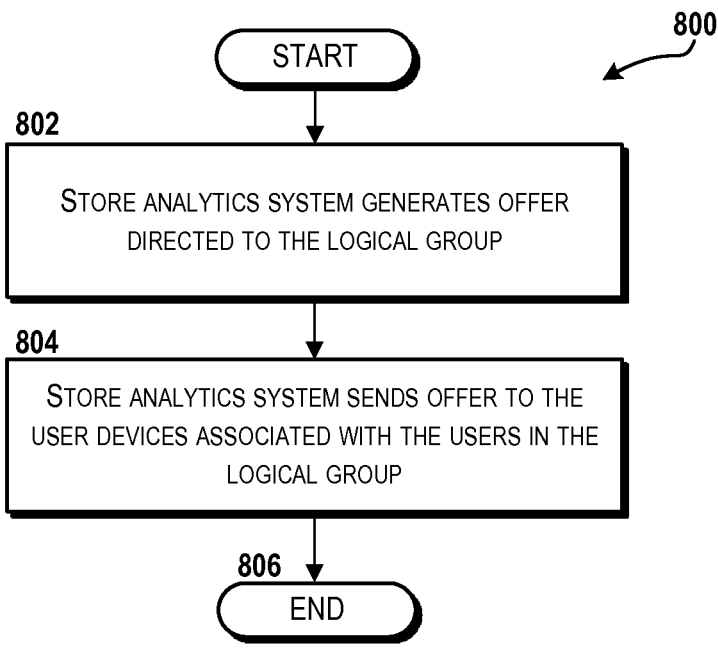
FIG. 8 is a flow diagram illustrating aspects of a method for generating offers directed to a logical group of users, according to an illustrative embodiment.

Turning now to FIG. 8, a method 800 for generating one or more offers directed to a logical group of users, such as the logical group 111, will be described, according to an illustrative embodiment. The method 800 begins and proceeds to operation 802, where the store analytics system 128 generates an offer directed to the logical group 111. From operation 802, the method 800 proceeds to operation 804, where the store analytics system 128 sends the offer to the user devices (e.g., the user devices 108A-108D) associated with the users (e.g., the users 110A-110D). From operation 804, the method 800 proceeds to operation 806. The method 800 ends at operation 806.

Figure 9:
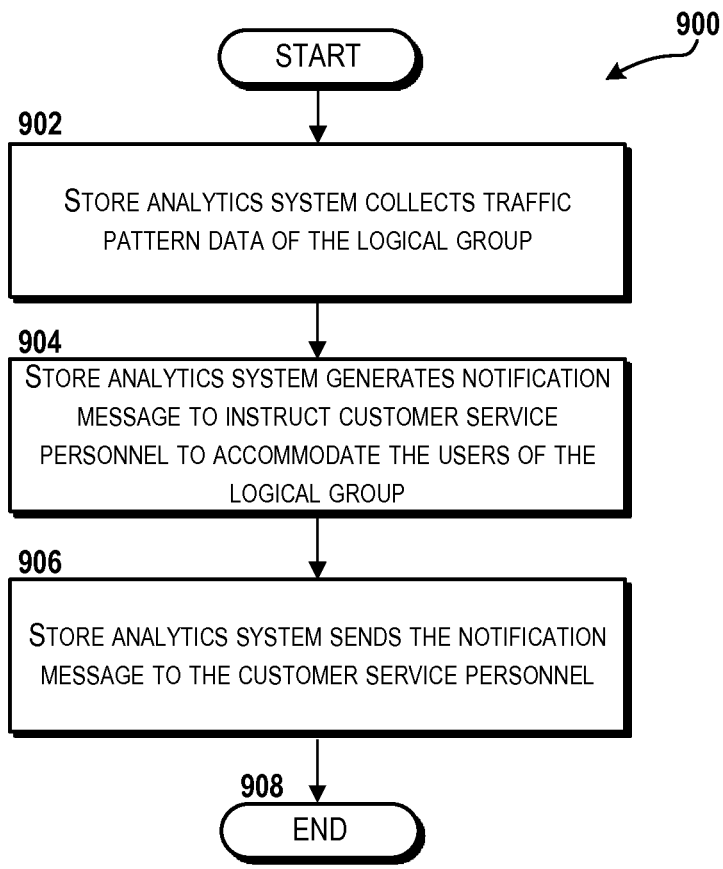
FIG. 9 is a flow diagram illustrating aspects of a method for instructing customer service personnel to accommodate a logical group of users, according to an illustrative embodiment.

Turning now to FIG. 9, a method 900 for instructing customer service personnel to accommodate a logical group of users, such as the logical group 111, will be described, according to an illustrative embodiment. The method 900 begins and proceeds to operation 902, where the store analytics system 128 collects traffic pattern data of the logical group 111 as the users 110A-110D in the logical group 111 move within the store premises 102. Movement of the users 110A-110D within the store premises 102 can be monitored via the store location system 130 leveraging the plurality of location beacons 106A-106D and/or other location techniques described herein.

From operation 902, the method 900 proceeds to operation 904, where the store analytics system 128 generates a notification message to instruct customer service personnel to accommodate the users 110A-110D in the logical group 111. For example, the traffic pattern can be used to predict an increase in traffic within a portion of the store premises 102, and the notification message can instruct the customer service personnel to move to the portion in order to assist the users 110A-110D in the logical group 111. Similarly, the traffic pattern can be used to predict an increase in customers ready to checkout, and the notification message can instruct the additional cashiers to deploy to accommodate the increase in customers. From operation 904, the method 900 proceeds to operation 906, where the store analytics system 128 sends the notification message to the customer service personnel. From operation 906, the method 900 proceeds to operation 908. The method 900 ends at operation 908.

Figure 10:
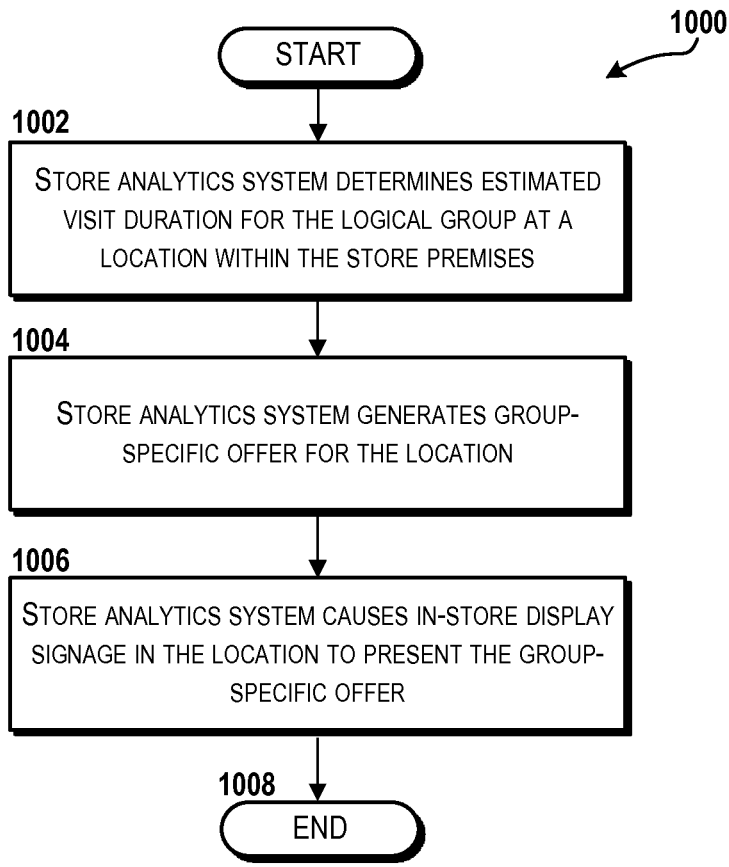
FIG. 10 is a flow diagram illustrating aspects of a method for generating a group-specific offer and causing in-store display signage to present the group-specific offer, according to an illustrative embodiment.

Turning now to FIG. 10, a method 1000 for generating a group-specific offer and causing in-store display signage, such as the signage 121, to present the group-specific offer will be described, according to an illustrative embodiment. The method 1000 begins and proceeds to operation 1002, where the store analytics system 128 determines an estimated visit duration for a logical group, such as the logical group 111, at a location within the store premises 102. From operation 1002, the method 1000 proceeds to operation 1004, where the store analytics system 128 generates a group-specific offer for the location. From operation 1004, the method 1000 proceeds to operation 1006, where the store analytics system 128 causes an in-store display signage, such as the signage 121, in the location to present the group-specific offer. From operation 1006, the method 1000 proceeds to operation 1008. The method 1000 ends at operation 1008.

Figure 11:
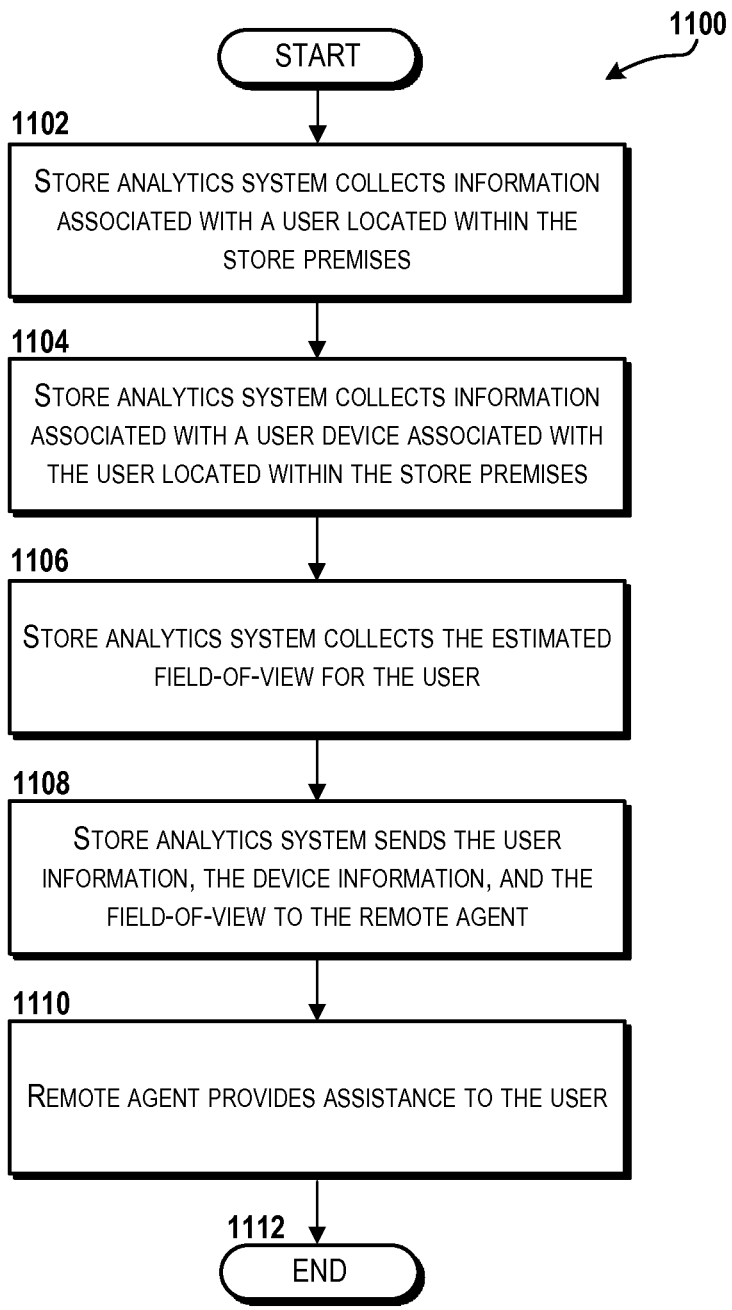
FIG. 11 is a flow diagram illustrating aspects of a method for providing customer service via remote agent, according to an illustrative embodiment.

Turning now to FIG. 11, a method 1100 for providing customer service via a remote agent, such as the remote agent 154, will be described, according to an illustrative embodiment. The method 1100 will be described with reference to FIGS. 1B and 11. The method 1100 begins and proceeds to operation 1102, where the store analytics system 128 collects information associated with a user, such as the user A 110A, located within the store premises 102. From operation 1102, the method 1100 proceeds to operation 1104, where the store analytics system 128 collects information associated with a user device, such as the user device A 108A, associated with the user located within the store premises 102. From operation 1104, the method 1100 proceeds to operation 1106, where the store analytics system 128 collects the estimated field-of-view of the user A 110A.

From operation 1106, the method 1100 proceeds to operation 1108, where the store analytics system 128 sends the user information, the device information, and the field-of-view to the remote agent 154. From operation 1108, the method 1100 proceeds to operation 1110, where the remote agent 154 provides assistance to the user A 110A. The remote agent 154 may assist the user A 110A in locating a particular item which may or may not be within the estimated field-of-view. The remote agent 154 may assist the user A 110A with past, present and/or future promotions associated with any of the one or more items within the estimated field-of-view of the user A 110A. The remote agent 154 may assist the user A 110A with selecting one or more of the items within the estimated field-of-view of the user A 110A that best suits his or her needs. It should be understood that the aforementioned assistance examples are merely exemplary and should not be construed as being limiting in any way.

From operation 1110, the method 1000 proceeds to operation 1112. The method 1100 ends at operation 1112.

Figure 12:
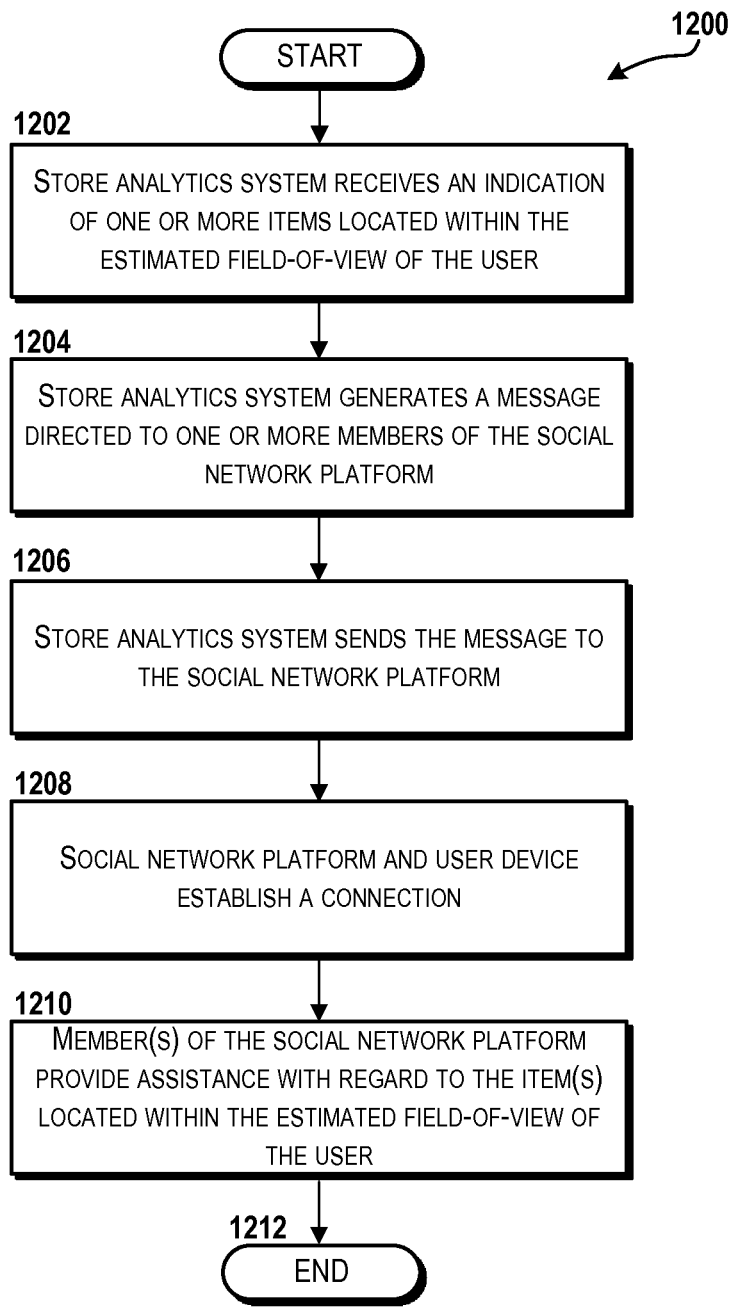
FIG. 12 is a flow diagram illustrating aspects of a method for leveraging one or more members of a social network platform to provide assistance with regard to one or more items located within an estimated-field-of-view of a user, according to an illustrative embodiment.

Turning now to FIG. 12, a method 1200 for leveraging one or more members of a social network platform, such as the social network platform 156, to provide assistance with regard to one or more items located within an estimated-field-of-view of a user, such as the user A 110A, will be described, according to an illustrative embodiment. The method 1200 will be described with reference to FIGS. 1C and 12. The method 1200 begins and proceeds to operation 1202, where the store analytics system 128 receives an indication of one or more items located within the estimated field-of-view of the user A 110A. From operation 1202, the method 1200 proceeds to operation 1204, where the store analytics system 128 generates a message directed to one or more members of the social network platform 156. From operation 1204, the method 1200 proceeds to operation 1206, where the store analytics system 128 sends the message to the social network platform 156.

From operation 1206, the method 1200 proceeds to operation 1208, where the social network platform 156 and the user device A 108A establish a connection. From operation 1208, the method 1200 proceeds to operation 1210, where one or more members of the social network platform 156 provide assistance to the user A 110A with regard to the item(s) located within the estimated field-of-view of the user A 110A.

From operation 1210, the method 1200 proceeds to operation 1212. The method 1200 ends at operation 1212.

Figure 13:
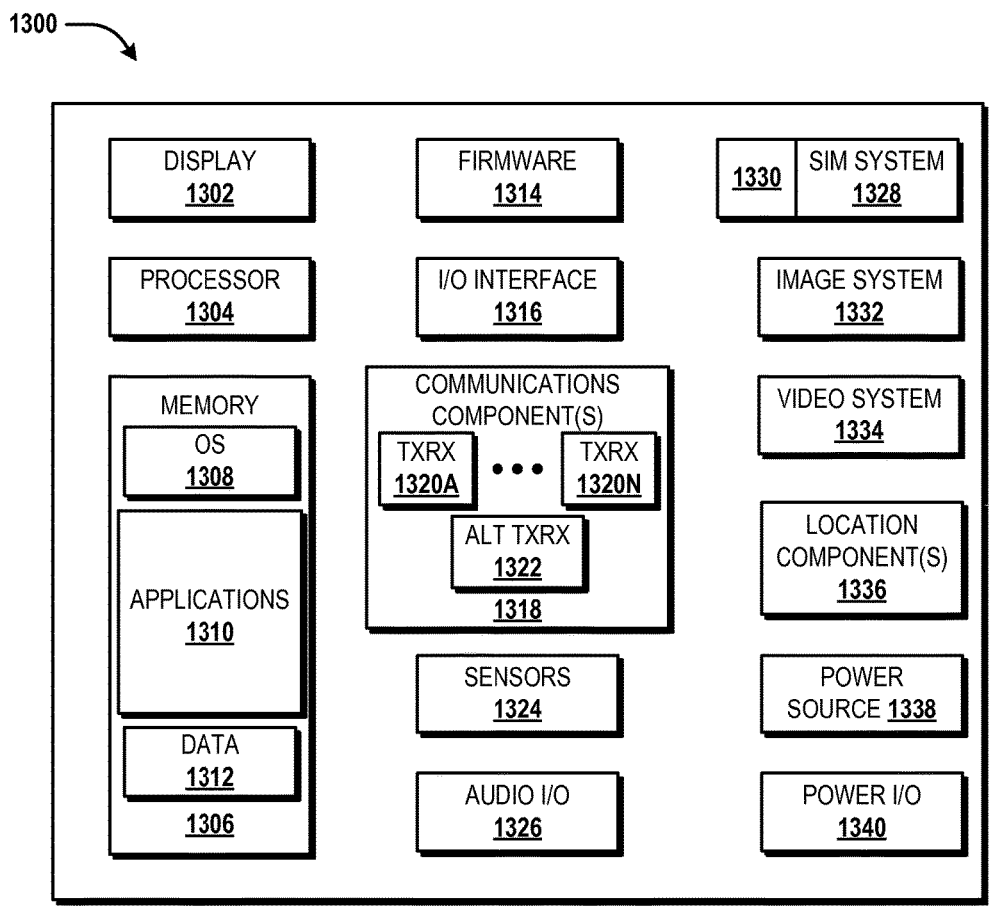
FIG. 13 is a block diagram illustrating an example mobile device, according to some illustrative embodiments.

Turning now to FIG. 13, an illustrative mobile device 1300 and components thereof will be described. In some embodiments, the user devices 108A-108D described above, in part, with reference to FIGS. 1A-1C can be configured as and/or can have an architecture similar or identical to the mobile device 1300 described herein with respect to FIG. 13. It should be understood, however, that the user devices 108A-108D may or may not include the functionality described herein with reference to FIG. 13. While connections are not shown between the various components illustrated in FIG. 13, it should be understood that some, none, or all of the components illustrated in FIG. 13 can be configured to interact with one other to carry out various device functions. In some embodiments, the components are arranged so as to communicate via one or more busses (not shown). Thus, it should be understood that FIG. 13 and the following description are intended to provide a general understanding of a suitable environment in which various aspects of embodiments can be implemented, and should not be construed as being limiting in any way.

As illustrated in FIG. 13, the mobile device 1300 can include a display 1302 for displaying data. According to various embodiments, the display 1302 can be configured to display at least a portion of the customer data 142, at least a portion of the store data 144, at least a portion of the product data 146, at least a portion of the advertisement data 148, various graphical user interface ("GUI") elements, text, images, video, virtual keypads and/or keyboards, messaging data, notification messages, metadata, internet content, device status, time, date, calendar data, device preferences, map and location data, customer service interactions, combinations thereof, and the like. The mobile device 1300 also can include a processor 1304 and a memory or other data storage device ("memory") 1306. The processor 1304 can be configured to process data and/or can execute computer-executable instructions stored in the memory 1306. The computer-executable instructions executed by the processor 1304 can include, for example, an operating system 1308, one or more applications 1310 such as the device application 116, other computer-executable instructions stored in a memory 1306, or the like. In some embodiments, the applications 1310 also can include a UI application (not illustrated in FIG. 13).

The UI application can interface with the operating system 1308 to facilitate user interaction with functionality and/or data stored at the mobile device 1300 and/or stored elsewhere, such as in the store database 134. In some embodiments, the operating system 1308 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 1304 to aid a user in interacting with at least a portion of the customer data 142, at least a portion of the store data 144, at least a portion of the product data 146, at least a portion of the advertisement data 148, and/or other data associated with the store premises 102, the user devices 108A-108D, the network 122, the network location system 124, the store analytics system 128, the store location system 130, the visual orientation system 114, the store database 134, and/or the other device and/or systems not specifically described herein. The UI application can be executed by the processor 1304 to aid a user in answering/initiating calls, entering/deleting other data, entering and setting user IDs and passwords for device access, configuring settings, manipulating address book content and/or settings, multimode interaction, interacting with other applications 1310, and otherwise facilitating user interaction with the operating system 1308, the applications 1310, and/or other types or instances of data 1312 that can be stored at the mobile device 1300.

According to various embodiments, the applications 1310 can include, for example, the device application 116, a visual field test application, a web browser application, presence applications, visual voice mail applications, messaging applications, text-to-speech and speech-to-text applications, add-ons, plug-ins, email applications, music applications, video applications, camera applications, location-based service applications, power conservation applications, game applications, productivity applications, entertainment applications, enterprise applications, combinations thereof, and the like. The applications 1310, the data 1312, and/or portions thereof can be stored in the memory 1306 and/or in a firmware 1314, and can be executed by the processor 1304. The firmware 1314 also can store code for execution during device power up and power down operations. It should be appreciated that the firmware 1314 can be stored in a volatile or non-volatile data storage device including, but not limited to, the memory 1306 and/or a portion thereof.

The mobile device 1300 also can include an input/output ("I/O") interface 1316. The I/O interface 1316 can be configured to support the input/output of data. In some embodiments, the I/O interface 1316 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 1300 can be configured to synchronize with another device to transfer content to and/or from the mobile device 1300. In some embodiments, the mobile device 1300 can be configured to receive updates to one or more of the applications 1310 via the I/O interface 1316, though this is not necessarily the case. In some embodiments, the I/O interface 1316 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 1316 may be used for communications between the mobile device 1300 and a network device or local device.

The mobile device 1300 also can include a communications component 1318. The communications component 1318 can be configured to interface with the processor 1304 to facilitate wired and/or wireless communications with one or more networks, such as the network 122 and the store network 126, and one or more of the plurality of beacons 106A-106D. In some embodiments, the communications component 1318 includes a multimode communications subsystem for facilitating communications via the cellular network and one or more other networks.

The communications component 1318, in some embodiments, includes one or more transceivers. The one or more transceivers, if included, can be configured to communicate over the same and/or different wireless technology standards with respect to one another. For example, in some embodiments one or more of the transceivers of the communications component 1318 may be configured to communicate using GSM, CDMAONE, CDMA2000, LTE, and various other 2G, 2.5G, 3G, 4G, and greater generation technology standards. Moreover, the communications component 1318 may facilitate communications over various channel access methods (which may or may not be used by the aforementioned standards) including, but not limited to, TDMA, FDMA, W-CDMA, OFDM, SDMA, and the like.

In addition, the communications component 1318 may facilitate data communications using GPRS, EDGE, the HSPA protocol family including HSDPA, EUL or otherwise termed HSUPA, HSPA+, and various other current and future wireless data access standards. In the illustrated embodiment, the communications component 1318 can include a first transceiver ("TxRx") 1320A that can operate in a first communications mode (e.g., GSM). The communications component 1318 also can include an $N^{th}$ transceiver ("TxRx") 1320N that can operate in a second communications mode relative to the first transceiver 1320A (e.g., UMTS). While two transceivers 1320A-N (hereinafter collectively and/or generically referred to as "transceivers 1320") are shown in FIG. 13, it should be appreciated that less than two, two, or more than two transceivers 1320 can be included in the communications component 1318.

The communications component 1318 also can include an alternative transceiver ("Alt TxRx") 1322 for supporting other types and/or standards of communications. According to various contemplated embodiments, the alternative transceiver 1322 can communicate using various communications technologies such as, for example, WI-FI, WIMAX, BLUETOOTH, BLE, infrared, infrared data association ("IRDA"), near field communications ("NFC"), other RF technologies, combinations thereof, and the like. As such, the alternative transceiver 1322 facilitates communications with one or more of the plurality of beacons 106A-106D.

In some embodiments, the communications component 1318 also can facilitate reception from terrestrial radio networks, digital satellite radio networks, internet-based radio service networks, combinations thereof, and the like. The communications component 1318 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 1300 also can include one or more sensors 1324. The sensors 1324 can include temperature sensors, light sensors, air quality sensors, movement sensors, orientation sensors (e.g., the orientation sensor(s) 118 shown in FIG. 1), noise sensors, proximity sensors, or the like. As such, it should be understood that the sensors 1324 can include, but are not limited to, accelerometers, magnetometers, gyroscopes, infrared sensors, noise sensors, microphones, combinations thereof, or the like. One or more of the sensors 1324 can be used to detect movement of the mobile device 1300. Additionally, audio capabilities for the mobile device 1300 may be provided by an audio I/O component 1326. The audio I/O component 1326 of the mobile device 1300 can include one or more speakers for the output of audio signals, one or more microphones for the collection and/or input of audio signals, and/or other audio input and/or output devices.

The illustrated mobile device 1300 also can include a subscriber identity module ("SIM") system 1328. The SIM system 1328 can include a universal SIM ("USIM"), a universal integrated circuit card ("UICC") and/or other identity devices. The SIM system 1328 can include and/or can be connected to or inserted into an interface such as a slot interface 1330. In some embodiments, the slot interface 1330 can be configured to accept insertion of other identity cards or modules for accessing various types of networks. Additionally, or alternatively, the slot interface 1330 can be configured to accept multiple subscriber identity cards. Because other devices and/or modules for identifying users and/or the mobile device 1300 are contemplated, it should be understood that these embodiments are illustrative, and should not be construed as being limiting in any way.

The mobile device 1300 also can include an image capture and processing system 1332 ("image system"). The image system 1332 can be configured to capture or otherwise obtain photos, videos, and/or other visual information. As such, the image system 1332 can include cameras, lenses, charge-coupled devices ("CCDs"), combinations thereof, or the like. The mobile device 1300 may also include a video system 1334. The video system 1334 can be configured to capture, process, record, modify, and/or store video content. Photos and videos obtained using the image system 1332 and the video system 1334, respectively, may be added as message content to an MMS message, email message, and sent to another mobile device. The video and/or photo content also can be shared with other devices via various types of data transfers via wired and/or wireless communication devices as described herein.

The mobile device 1300 also can include one or more location components 13313 (e.g., the location component(s) 120 described above with reference to FIG. 1). The location components 1336 can be configured to send and/or receive signals to determine a location of the mobile device 1300. According to various embodiments, the location components 1336 can send and/or receive signals from GPS devices, assisted-GPS ("A-GPS") devices, WI-FI/WIMAX and/or cellular network triangulation data, combinations thereof, and the like. The location component 1336 also can be configured to communicate with the communications component 1318 to retrieve triangulation data for determining a location of the mobile device 1300. In some embodiments, the location component 1336 can interface with cellular network nodes, telephone lines, satellites, location transmitters and/or beacons, wireless network transmitters and receivers, combinations thereof, and the like. In some embodiments, the location component 1336 can include and/or can communicate with one or more of the sensors 1324 such as a compass, an accelerometer, and/or a gyroscope to determine the orientation of the mobile device 1300. Using the location component 1336, the mobile device 1300 can generate and/or receive data to identify its geographic location, or to transmit data used by other devices to determine the location of the mobile device 1300. The location component 1336 may include multiple components for determining the location and/or orientation of the mobile device 1300.

The illustrated mobile device 1300 also can include a power source 1338. The power source 1338 can include one or more batteries, power supplies, power cells, and/or other power subsystems including alternating current ("AC") and/or direct current ("DC") power devices. The power source 1338 also can interface with an external power system or charging equipment via a power I/O component 1340. Because the mobile device 1300 can include additional and/or alternative components, the above embodiment should be understood as being illustrative of one possible operating environment for various embodiments of the concepts and technologies described herein. The described embodiment of the mobile device 1300 is illustrative, and should not be construed as being limiting in any way.

Figure 14:
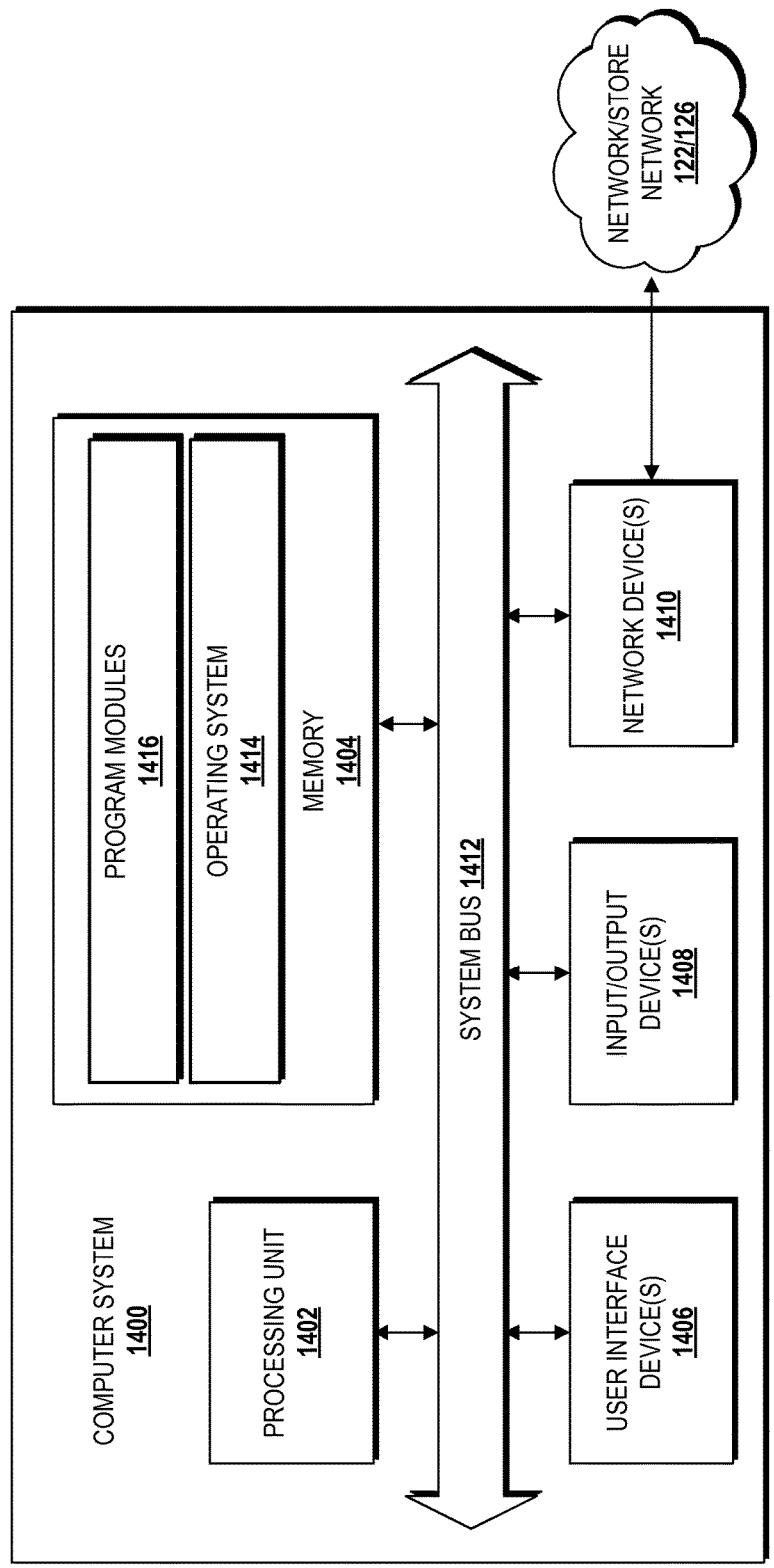
FIG. 14 is a block diagram illustrating an example computer system, according to some illustrative embodiments.

FIG. 14 is a block diagram illustrating a computer system 1400 configured to provide the functionality described herein in accordance with various embodiments of the concepts and technologies disclosed herein. In some embodiments, the user devices 108A-108D, the store analytics system 128, the store location system 130, and/or the visual orientation system 114, can be configured as and/or can have an architecture similar or identical to the computer system 1400 described herein with respect to FIG. 14. It should be understood, however, that the user devices 108A-108D, the store analytics system 128, the store location system 130, and/or the visual orientation system 114 may or may not include the functionality described herein with reference to FIG. 14.

The computer system 1400 includes a processing unit 1402, a memory 1404, one or more user interface devices 1406, one or more input/output ("I/O") devices 1408, and one or more network devices 1410, each of which is operatively connected to a system bus 1412. The bus 1412 enables bi-directional communication between the processing unit 1402, the memory 1404, the user interface devices 1406, the I/O devices 1408, and the network devices 1410.

The processing unit 1402 may be a standard central processor that performs arithmetic and logical operations, a more specific purpose programmable logic controller ("PLC"), a programmable gate array, or other type of processor known to those skilled in the art and suitable for controlling the operation of the computer system 1400.

Processing units are generally known, and therefore are not described in further detail herein.

The memory 1404 communicates with the processing unit 1402 via the system bus 1412. In some embodiments, the memory 1404 is operatively connected to a memory controller (not shown) that enables communication with the processing unit 1402 via the system bus 1412. The memory 1404 includes an operating system 1414 and one or more program modules 1416. The operating system 1414 can include, but is not limited to, members of the WINDOWS, WINDOWS CE, and/or WINDOWS MOBILE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS, and/or iOS families of operating systems from APPLE CORPORATION, the FREEBSD family of operating systems, the SOLARIS family of operating systems from ORACLE CORPORATION, other operating systems, and the like.

The program modules 1416 may include various software and/or program modules described herein. In some embodiments, for example, the program modules 1416 include the device application 116, the store analytics application 136, the logical group predictor application 138, the user behavior predictor application 140, the store location application 150, or the visual orientation application 152. The device application 116, the store analytics application 136, the logical group predictor application 138, the user behavior predictor application 140, the store location application 150, the visual orientation application 152, and/or other software programs can be embodied in computer-readable media containing instructions that, when executed by the processing unit 1402, perform at least a portion of one or more of the methods 200, 300, 400, 500, 600, 700, 800, 900, 1000, 1100, 1200 described in detail above with respect to FIGS. 2-12. According to embodiments, the program modules 1416 may be embodied in hardware, software, firmware, or any combination thereof. Although not shown in FIG. 14, it should be understood that the memory 1404 also can be configured to store all or a portion of the store database 134 and/or other data, if desired.

By way of example, and not limitation, computer-readable media may include any available computer storage media or communication media that can be accessed by the computer system 1400. Communication media includes computer-readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

Computer storage media includes volatile and non-volatile, removable and non-removable media implemented in any method or technology for storage of information such as computer-readable instructions, data structures, program modules, or other data. Computer storage media includes, but is not limited to, RAM, ROM, Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer system 1400. In the claims, the phrase "computer storage medium" and variations thereof does not include waves or signals per se and/or communication media.

The user interface devices 1406 may include one or more devices with which a user accesses the computer system 1400. The user interface devices 1406 may include, but are not limited to, computers, servers, personal digital assistants, cellular phones, or any suitable computing devices. The I/O devices 1408 enable a user to interface with the program modules 1416. In one embodiment, the I/O devices 1408 are operatively connected to an I/O controller (not shown) that enables communication with the processing unit 1402 via the system bus 1412. The I/O devices 1408 may include one or more input devices, such as, but not limited to, a keyboard, a mouse, or an electronic stylus. Further, the I/O devices 1408 may include one or more output devices, such as, but not limited to, a display screen or a printer to output data such as the data stored in the store database 134 in the form of text, numbers, characters, maps, other visualizations, and the like.

The network devices 1410 enable the computer system 1400 to communicate with other networks or remote systems via one or more networks such as the network 122 and/or the store network 126. Examples of the network devices 1410 include, but are not limited to, a modem, a radio frequency ("RF") or infrared ("IR") transceiver, a telephonic interface, a bridge, a router, or a network card. The network(s) may include a wireless network such as, but not limited to, a WLAN such as a WI-FI network, a WWAN, a Wireless Personal Area Network ("WPAN") such as BLUETOOTH, a WMAN such a WiMAX network, or a cellular network. Alternatively, the network(s) may be a wired network such as, but not limited to, a WAN such as the Internet, a LAN, a wired PAN, or a wired MAN.

Figure 15:
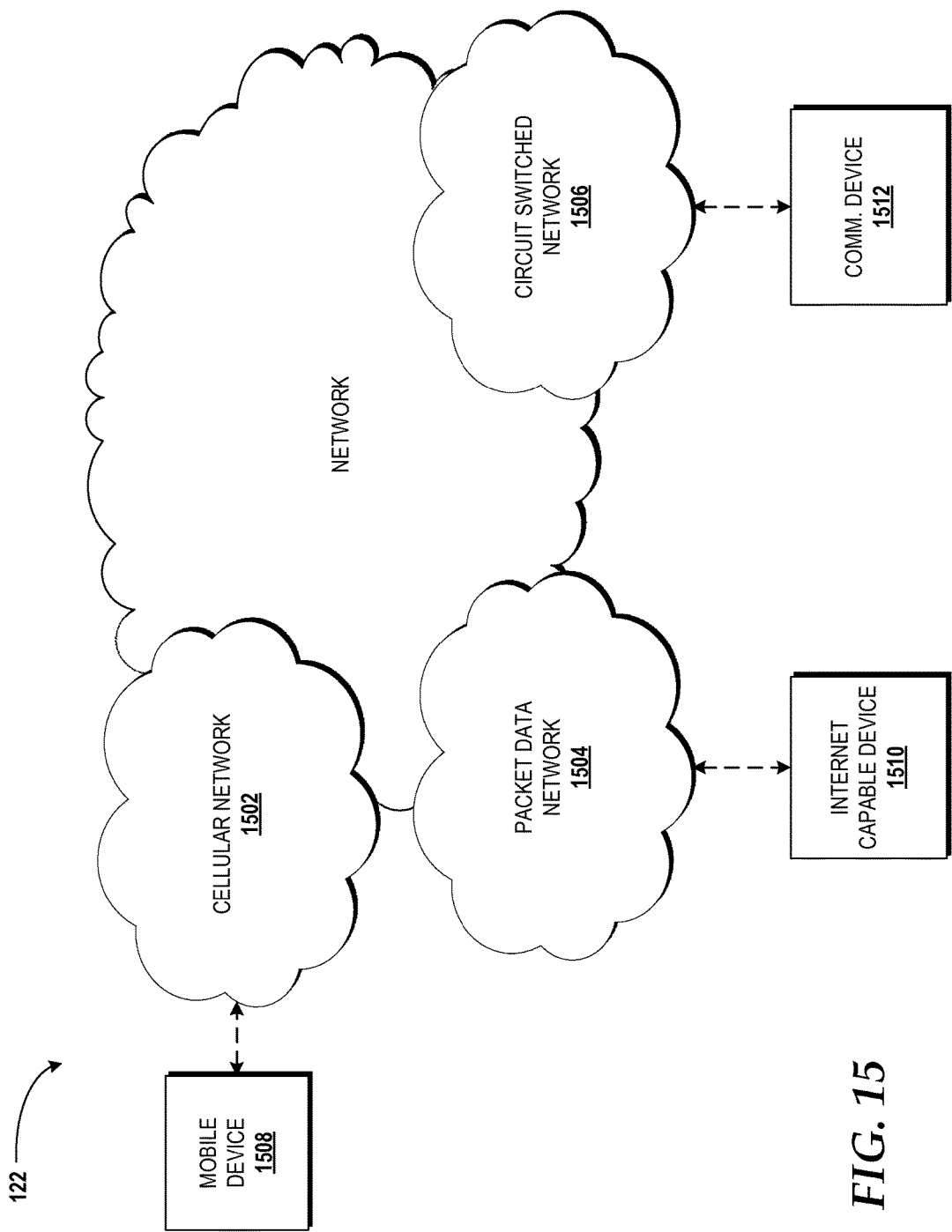
FIG. 15 schematically illustrates a network, according to an illustrative embodiment.

Turning now to FIG. 15, additional details of an embodiment of the network 122 are illustrated, according to an illustrative embodiment. The network 122 includes a cellular network 1502, a packet data network 1504, for example, the Internet, and a circuit switched network 1506, for example, a publicly switched telephone network ("PSTN"). The cellular network 1502 includes various components such as, but not limited to, base transceiver stations ("BTSs"), Node-B's or e-Node-B's, base station controllers ("BSCs"), radio network controllers ("RNCs"), mobile switching centers ("MSCs"), mobile management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, an IP Multimedia Subsystem ("IMS"), and the like. The cellular network 1502 also includes radios and nodes for receiving and transmitting voice, data, and combinations thereof to and from radio transceivers, networks, the packet data network 1504, and the circuit switched network 1506.

A mobile communications device 1508, such as, for example, the user devices 108A-108D, a cellular telephone, a user equipment, a mobile terminal, a PDA, a laptop computer, a handheld computer, and combinations thereof, can be operatively connected to the cellular network 1502. The cellular network 1502 can be configured as a 2G GSM network and can provide data communications via GPRS and/or EDGE. Additionally, or alternatively, the cellular network 1502 can be configured as a 3G UMTS network and can provide data communications via the HSPA protocol family, for example, HSDPA, EUL (also referred to as HSUPA), and HSPA+. The cellular network 1502 also is compatible with 4G mobile communications standards as well as evolved and future mobile standards.

The packet data network 1504 includes various devices, for example, servers, computers, databases, and other devices in communication with one another, as is generally known. The packet data network 1504 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 1504 includes or is in communication with the Internet. In some embodiments, access to the packet data network 1504 can be provided, at least in part, via WIFI, BLUETOOTH, BLUETOOTH LE, and/or other communications protocols.

The circuit switched network 1506 includes various hardware and software for providing circuit switched communications. The circuit switched network 1506 may include, or may be, what is often referred to as a plain old telephone system ("POTS"). The functionality of a circuit switched network 1506 or other circuit-switched network are generally known and will not be described herein in detail.

The illustrated cellular network 1502 is shown in communication with the packet data network 1504 and a circuit switched network 1506, though it should be appreciated that this is not necessarily the case. One or more Internet-capable devices 1515, for example, a personal computer ("PC"), a laptop, a portable device, or another suitable device, can communicate with one or more cellular networks 1502, and devices connected thereto, through the packet data network 1504. It also should be appreciated that the Internet-capable device 1510 can communicate with the packet data network 1504 through the circuit switched network 1506, the cellular network 1502, and/or via other networks (not illustrated).

As illustrated, a communications device 1512, for example, a telephone, facsimile machine, modem, computer, or the like, can be in communication with the circuit switched network 1506, and therethrough to the packet data network 1504 and/or the cellular network 1502. It should be appreciated that the communications device 1512 can be an Internet-capable device, and can be substantially similar to the Internet-capable device 1510. In the specification, the network 122 may be used to refer broadly to any combination of the networks 1502, 1504, 1506. It should be appreciated that substantially all of the functionality described with reference to the network 122 can be performed by the cellular network 1502, the packet data network 1504, and/or the circuit switched network 1506, alone or in combination with other networks, network elements, and the like.

Based on the foregoing, it should be appreciated that aspects of customer service based upon in-store field-of-view and analytics have been disclosed herein. Although the subject matter presented herein has been described in language specific to computer structural features, methodological and transformative acts, specific computing machinery, and computer-readable media, it is to be understood that the concepts and technologies disclosed herein are not necessarily limited to the specific features, acts, or media described herein. Rather, the specific features, acts and mediums are disclosed as example forms of implementing the concepts and technologies disclosed herein.

The subject matter described above is provided by way of illustration only and should not be construed as limiting. Various modifications and changes may be made to the subject matter described herein without following the example embodiments and applications illustrated and described, and without departing from the true spirit and scope of the embodiments of the concepts and technologies disclosed herein.

What is claimed is:

1. A method comprising
    collecting, by a store analytics system comprising a processor that executes a store analytics application, user information associated with a plurality of users located within a store premises, wherein the user information uniquely identifies each of the plurality of users as a customer of the store premises, and wherein the store premises comprises a plurality of aisles in which a plurality of items are located;
    collecting, by the store analytics system, user device information associated with a plurality of user devices associated with the plurality of users, wherein the user device information uniquely identifies each of the plurality of user devices;
    receiving, by the store analytics system, from a visual orientation system, estimated fields-of-view associated with the plurality of users, wherein each estimated field-of-view of the estimated fields-of-view is determined by the visual orientation system based upon an orientation of a user device of the plurality of user devices and a location of the user device of the plurality of user devices within the store premises, wherein the orientation of the user device is determined by the user device via an orientation sensor of the user device in response to the orientation sensor detecting that the user device has stopped within the store premises at a specific time, wherein the location of the user device is determined by the user device via a location component of the user device further in response to the orientation sensor detecting that the user device has stopped within the store premises at the specific time, and wherein each estimated field-of-view of the estimated fields-of-view identifies an aisle of the plurality of aisles and an item of the plurality of items in the aisle;
    determining, by the store analytics system, based upon the user information, the user device information, and the estimated fields-of-view, a commonality shared among at least two users of the plurality of users, wherein the commonality comprises each user of the at least two users of the plurality of users having the item of the plurality of items in an estimated field-of-view with the at least two users; and
    creating, by the store analytics system, a logical group, wherein the logical group comprises a group of customers of the store premises comprising the at least two users of the plurality of users that share the commonality.

2. The method of claim 1, further comprising:
    generating, by the store analytics system, an offer directed to the logical group, wherein the offer is associated with the item; and
    sending, by the store analytics system, the offer to the logical group.

3. The method of claim 2, wherein sending, by the store analytics system, the offer to the logical group comprises sending, by the store analytics system, the offer to each user device of the plurality of user devices that is associated with a member of the logical group.

4. The method of claim 2, wherein sending, by the store analytics system, the offer to the logical group comprises sending, by the store analytics system, the offer to a signage for presentation of the offer to the logical group, wherein the signage displays a price for the item particular to the logical group.

5. The method of claim 1, further comprising:
collecting, by the store analytics system, traffic pattern data associated with a traffic pattern of the logical group as members of the logical group move within the store premises;
generating, by the store analytics system, a notification message to instruct customer service personnel associated with the store premises to assist members of the logical group with the item; and
sending, by the store analytics system, the notification message to the customer service personnel.

6. The method of claim 1, further comprising instructing, by the store analytics system, a remote agent to provide assistance to members of the logical group with regard to the item.

7. The method of claim 1, further comprising:
generating, by the store analytics system, a message directed to a member of a social network platform, wherein the message instructs the member of the social network platform to provide assistance to the logical group with regard to the item; and
sending, by the store analytics system, the message to the member of the social network platform so that the member of the social network platform can provide assistance to the logical group with regard to the item.

8. A store analytics system comprising:
a processor; and
memory that stores computer-executable instructions that, when executed by the processor, cause the processor to perform operations comprising
collecting user information associated with a plurality of users located within a store premises, wherein the user information uniquely identifies each of the plurality of users as a customer of the store premises, and wherein the store premises comprises a plurality of aisles in which a plurality of items are located,
collecting user device information associated with a plurality of user devices associated with the plurality of users, wherein the user device information uniquely identifies each of the plurality of user devices,
receiving, from a visual orientation system, estimated fields-of-view associated with the plurality of users, wherein each estimated field-of-view of the estimated fields-of-view is determined by the visual orientation system based upon an orientation of a user device of the plurality of user devices and a location of the user device of the plurality of user devices within the store premises, wherein the orientation of the user device is determined by the user device via an orientation sensor of the user device in response to the orientation sensor detecting that the user device has stopped within the store premises at a specific time, wherein the location of the user device is determined by the user device via a location component of the user device further in response to the orientation sensor detecting that the user device has stopped within the store premises at the specific time, and wherein each estimated field-of-view of the estimated fields-of-view identifies an aisle of the plurality of aisles and an item of the plurality of items in the aisle,
determining, based upon the user information, the user device information, and the estimated fields-of-view, a commonality shared among at least two users of the plurality of users, wherein the commonality comprises each user of the at least two users of the plurality of users having the item of the plurality of items in an estimated field-of-view with the at least two users, and
creating a logical group, wherein the logical group comprises a group of customers of the store premises comprising the at least two users of the plurality of users that share the commonality.

9. The store analytics system of claim 8, wherein the operations further comprise:
generating an offer directed to the logical group, wherein the offer is associated with the item; and
sending the offer to the logical group.

10. The store analytics system of claim 9, wherein sending the offer to the logical group comprises sending the offer to each user device of the plurality of user devices that is associated with a member of the logical group.

11. The store analytics system of claim 9, wherein sending the offer to the logical group comprises sending the offer to a signage for presentation of the offer to the logical group, wherein the signage displays a price for the item particular to the logical group.

12. The store analytics system of claim 8, wherein the operations further comprise:
collecting traffic pattern data associated with a traffic pattern of the logical group as members of the logical group move within the store premises;
generating a notification message to instruct customer service personnel associated with the store premises to assist members of the logical group with the item; and
sending the notification message to the customer service personnel.

13. The store analytics system of claim 8, wherein the operations further comprise instructing a remote agent to provide assistance to members of the logical group with regard to the item.

14. The store analytics system of claim 8, wherein the operations further comprise:
generating a message directed to a member of a social network platform, wherein the message instructs the member of the social network platform to provide assistance to the logical group with regard to the item; and
sending the message to the member of the social network platform so that the member of the social network platform can provide assistance to the logical group with regard to the item.

15. A computer-readable storage medium having computer-executable instructions that, when executed by a processor of a store analytics system, cause the store analytics system to perform operations comprising:
collecting user information associated with a plurality of users located within a store premises, wherein the user information uniquely identifies each of the plurality of users as a customer of the store premises, and wherein the store premises comprises a plurality of aisles in which a plurality of items are located;
collecting user device information associated with a plurality of user devices associated with the plurality of users, wherein the user device information uniquely identifies each of the plurality of user devices;

receiving, from a visual orientation system, estimated fields-of-view associated with the plurality of users, wherein each estimated field-of-view of the estimated fields-of-view is determined by the visual orientation system based upon an orientation of a user device of the plurality of user devices and a location of the user device of the plurality of user devices within the store premises, wherein the orientation of the user device is determined by the user device via an orientation sensor of the user device in response to the orientation sensor detecting that the user device has stopped within the store premises at a specific time, wherein the location of the user device is determined by the user device via a location component of the user device further in response to the orientation sensor detecting that the user device has stopped within the store premises at the specific time, and wherein each estimated field-of-view of the estimated fields-of-view identifies an aisle of the plurality of aisles and an item of the plurality of items in the aisle;

determining, based upon the user information, the user device information, and the estimated fields-of-view, a commonality shared among at least two users of the plurality of users, wherein the commonality comprises each user of the at least two users of the plurality of users having the item of the plurality of items in an estimated field-of-view with the at least two users; and creating a logical group, wherein the logical group comprises a group of customers of the store premises comprising the at least two users of the plurality of users that share the commonality.

16. The computer-readable storage medium of claim 15, wherein the operations further comprise:

generating an offer directed to the logical group, wherein the offer is associated with the item; and sending the offer to the logical group.

17. The computer-readable storage medium of claim 16, wherein sending the offer to the logical group comprises sending the offer to each user device of the plurality of user devices that is associated with a member of the logical group.

18. The computer-readable storage medium of claim 16, wherein sending the offer to the logical group comprises sending the offer to a signage for presentation of the offer to the logical group, wherein the signage displays a price for the item that is particular to the logical group.

19. The computer-readable storage medium of claim 15, wherein the operations further comprise instructing a remote agent to provide assistance to members of the logical group with regard to the item.

20. The computer-readable storage medium of claim 15, wherein the operations further comprise:

generating a message directed to a member of a social network platform, wherein the message instructs the member of the social network platform to provide assistance to the logical group with regard to the item; and sending the message to the member of the social network platform so that the member of the social network platform can provide assistance to the logical group with regard to the item.

* * * * *